United States Patent
Sha et al.

(10) Patent No.: US 12,457,582 B2
(45) Date of Patent: Oct. 28, 2025

(54) METHOD AND APPARATUS FOR PAGING CARRIER SELECTION

(71) Applicant: ZTE Corporation, Guangdong (CN)

(72) Inventors: Xiubin Sha, Guangdong (CN); Bo Dai, Guangdong (CN); Ting Lu, Guangdong (CN); Jie Tan, Guangdong (CN); Li Niu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 476 days.

(21) Appl. No.: 18/127,443

(22) Filed: Mar. 28, 2023

(65) Prior Publication Data

US 2023/0254814 A1 Aug. 10, 2023

Related U.S. Application Data

(63) Continuation of application No. PCT/CN2020/118321, filed on Sep. 28, 2020.

(51) Int. Cl.
*H04W 68/02* (2009.01)
*H04L 5/00* (2006.01)
(Continued)

(52) U.S. Cl.
CPC ........... *H04W 68/02* (2013.01); *H04L 5/0098* (2013.01); *H04W 68/08* (2013.01);
(Continued)

(58) Field of Classification Search
CPC . H04W 68/02; H04W 68/025; H04W 68/005; H04W 76/27; H04W 68/00;
(Continued)

(56) References Cited

U.S. PATENT DOCUMENTS

| | | | | |
|---|---|---|---|---|
| 11,653,331 B2* | 5/2023 | Murray | ................ | H04B 7/0695 |
| | | | | 455/458 |
| 2018/0192354 A1* | 7/2018 | Yi | ......................... | H04L 5/0053 |

(Continued)

FOREIGN PATENT DOCUMENTS

| | | | | |
|---|---|---|---|---|
| CA | 3063618 A1 * | 12/2019 | ............ | H04W 76/30 |
| CN | 101453785 B * | 8/2012 | ............ | H04W 68/02 |

(Continued)

OTHER PUBLICATIONS

CNIPA, First Office Action for Chinese Application No. 202311146048.9, mailed on Apr. 10, 2024, 11 pages with unofficial English translation.

(Continued)

*Primary Examiner* — Dung Hong
(74) *Attorney, Agent, or Firm* — Perkins Coie LLP

(57) ABSTRACT

This patent document describes, among other things, techniques, and apparatuses for providing paging carrier selection based on a coverage enhancement level (CEL) and associated carrier specific configuration. In one aspect, a method of wireless communication is disclosed. The method includes receiving, by a wireless device, from a first network node, a paging radio resource specific paging configuration, selecting, by the wireless device, a paging radio resource based on a paging radio resource specific paging configuration, wherein the selecting further uses a wireless device specific paging configuration in case that the wireless device is configured with the wireless device specific paging configuration, and performing a further communication operation based on the paging radio resource that is selected by the wireless device.

23 Claims, 15 Drawing Sheets

(51) Int. Cl.
*H04W 68/08* (2009.01)
*H04W 72/0457* (2023.01)
*H04W 72/542* (2023.01)
*H04W 76/28* (2018.01)

(52) U.S. Cl.
CPC ..... *H04W 72/0457* (2023.01); *H04W 72/542* (2023.01); *H04W 76/28* (2018.02)

(58) Field of Classification Search
CPC ........... H04W 72/542; H04W 72/0457; H04W 68/08; H04W 76/28; H04L 5/0098
See application file for complete search history.

(56) References Cited

U.S. PATENT DOCUMENTS

| | | | |
|---|---|---|---|
| 2019/0082417 A1 | 3/2019 | Bolle et al. | |
| 2019/0191483 A1* | 6/2019 | Ryoo | H04W 52/0229 |
| 2020/0107294 A1 | 4/2020 | Ji et al. | |
| 2020/0154393 A1* | 5/2020 | Höglund | H04W 68/02 |
| 2020/0170069 A1 | 5/2020 | Shih et al. | |
| 2020/0305120 A1* | 9/2020 | Tang | H04W 68/00 |
| 2021/0058893 A1 | 2/2021 | Sha et al. | |
| 2021/0266840 A1* | 8/2021 | Xu | H04W 68/00 |

FOREIGN PATENT DOCUMENTS

| | | | | |
|---|---|---|---|---|
| CN | 107343299 A | * | 11/2017 | ........... H04W 36/04 |
| CN | 108012329 A | * | 5/2018 | ........... H04L 5/0048 |
| CN | 108616985 A | | 10/2018 | |
| CN | 108616986 A | | 10/2018 | |
| CN | 109246820 A | * | 1/2019 | ........... H04W 68/02 |
| CN | 110351815 A | | 10/2019 | |
| CN | 110710285 A | | 1/2020 | |
| CN | 111096008 A | | 5/2020 | |
| GB | 2552838 A | | 2/2018 | |
| WO | 2018031928 A1 | | 2/2018 | |
| WO | 2019192303 A1 | | 10/2019 | |

OTHER PUBLICATIONS

CNIPA, Second Office Action for Chinese Application No. 202311146048.9, mailed on Jun. 21, 2024, 8 pages with unofficial English translation.

CNIPA, Rejection Decision for Chinese Application No. 202311146048.9, mailed on Sep. 19, 2024, 9 pages with unofficial English translation.
JPO, Office Action for Japanese Application No. 2023-519499, mailed on Apr. 16, 2024, 6 pages with unofficial English translation.
MediaTek Inc., "DL Quality Report on non-anchor carrier in NB-IoT," 3GPP TSG RAN WG1 #96, Athens, Greece, R1-1901734, Feb. 25-Mar. 1, 2019, 3 pages.
Oppo et al., "Solution for key issue#1 handling of MT service," SA WG2 #136 AH, Incheon, Korea, S2- 2000308, Jan. 13-17, 2020, 7 pages.
Ericsson, "NB-IoT carrier selection and configuration based on coverage level," 3GPP TSG-RAN WG2 #111e, R2-2006832, Electronic meeting, Aug. 17-28, 2020, 2 pages.
ZTE Corporation et al., "Enhancements on multi carrier configuration and selection," 3GPP TSG-RAN WG2 Meeting #111 electronic, R2-2006835, Aug. 17-28, 2020, 9 pages.
Huawei et al., "Use cases and scenarios of carrier specific configuration," 3GPP TSG-RAN WG2 Meeting #111-e, R2-2007343, Online, Aug. 17-28, 2020, 4 pages.
Nokia et al., "Analysis on carrier selection options for NB-IoT," 3GPP TSG-RAN2#110 Electronic, R2-2007354, Aug. 17-28, 2020, 3 pages.
Qualcomm Incorporated, "Support for NB-IoT carrier selection based on the coverage level," 3GPP TSG RAN G2 #111-e, Tdoc R2-2007570, Aug. 17-28, 2020, 3 pages.
Mediatek, Inc., "Carrier selection enhancement," 3GPP TSG-RAN WG2 Meeting #111-e Meeting, R2-2007957, Online, Aug. 17-28, 2020, 3 pages.
International Preliminary Report on Patentability issued in International Patent Application No. PCT/CN2020/118321, dated Mar. 28, 2023, 4 pages.
European Search Report issued in EP Patent Application No. 20954715.7, dated Nov. 28, 2023, 12 pages.
Ericsson, "[AT111-e][309][NBIOT/eMTC R17] Carrier selection (Ericsson)," 3GPP TSG-RAN WG2 #111-e, R2-2008311, Online, Aug. 17-28, 2020, 8 pages.
JP, Decision to Grant Patent for Japanese Application No. 2023-519499, mailed on Sep. 18, 2024 with English Translation, 6 pages.
EPO, Office Action for European Application No. 20 954 715.7, mailed on May 2, 2025, 9 pages.
International Search Report and Written Opinion for International Application No. PCT/CN2020/118321, mail date: Jun. 29, 2021. 6 pages.
Alcatel-Lucent Shanghai Bell et al., "CSI-RS transmissions in subframes used for paging," 3GPP TSG-RAN WG2 #79 meeting, Qingdao, China, R2-123912, Aug. 13-17, 2012. 4 pages.

* cited by examiner

METHOD AND APPARATUS FOR PAGING CARRIER SELECTION

CROSS-REFERENCE TO RELATED APPLICATIONS

This application is a continuation of International Patent Application No. PCT/CN2020/118321, filed on Sep. 28, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques, and apparatuses for providing paging carrier selection based on a wireless device specific paging configuration and associated paging radio resource specific configuration (e.g., carrier specific configuration).

In one aspect, a method of wireless communication is disclosed. The method includes receiving, by a wireless device, from a first network node, a paging radio resource specific paging configuration, selecting, by the wireless device, a paging radio resource based on a paging radio resource specific paging configuration, wherein the selecting further uses a wireless device specific paging configuration in case that the wireless device is configured with the wireless device specific paging configuration, and performing a further communication operation based on the paging radio resource that is selected by the wireless device.

In another aspect, a method of wireless communication is disclosed. The method includes transmitting, by a first network node, to a wireless device, a paging radio resource specific paging configuration, and performing a paging operation using a paging radio resource selected based on the wireless device specific paging configuration and a paging radio resource specific paging configuration.

These, and other, aspects are described in the present document.

DETAILED DESCRIPTION

Certain features are described using the example of Narrowband Internet of Things (NB-IoT) wireless protocol. However, applicability of the disclosed techniques is not limited to only NB-IoT wireless protocol, and thus the disclosed technology is applicable to any wireless standard. Section headings are used in the present document only to improve readability and do not limit scope of the disclosed embodiments and techniques in each section to only that section.

Paging is the mechanism in which the network wakes up a user device to initiate an appropriate procedure. For example, in 3GPP standards, paging messages (PAGING) are transmitted on the physical downlink shared channel (PDSCH) scheduled by the physical downlink control channel (PDCCH) associated with Paging-Radio Network Temporary Identifier (P-RNTI).

The P-RNTI is a radio network temporary identifier (RNTI) that is common to multiple user devices (hereinafter referred to as UE). However, different UEs may be in different coverage enhancement level, and UEs in different coverage enhancement level may have different maximum numbers of repetitions for NPDCCH common search space (CSS) for paging (e.g., Rmax-paging).

In general, an increase in the value of the Rmax-paging leads to an increase in the use of the radio resource to send paging messages and an increase in the discontinuous reception (DRX) cycle to avoid common search space (CSS)-paging overlap (e.g., a paging PDCCH transmission and the next paging PDCCH transmission may overlap), which may result in a large paging delay.

Thus, if the same radio resource is used for paging for all UEs, the Rmax-paging and DRX cycle should be configured in common for all UEs, and the values should be large enough, causing a waste of the paging radio resource for the UEs in a low coverage enhancement level (CEL). In addition, if paging messages for UEs in different CELs are carried on different radio resources (e.g., different carriers, different paging narrowbands, etc.), different Rmax-paging numbers and DRX cycle values can be set for UEs in different CELs to avoid the waste of the paging radio resource for UEs in a lower CEL and reduce a potential paging delay.

The disclosed technology can be implemented in various embodiments to configure different Rmax-paging and DRX cycle for UEs in different CELs and select a paging radio resource accordingly.

Some embodiments of the disclosed technology can apply to a paging narrowband selection in an enhanced machine type communication (eMTC), or a paging resource selection (e.g., paging BWP selection, paging PRB selection, paging narrowband selection, paging DRX cycle selection, etc.) in the new radio (NR).

Method 1

In some implementations of the disclosed technology, the maximum number of repetitions for the narrowband physical downlink control channel (NPDCCH) common search space (CSS) for paging (e.g., Rmax-paging) or CEL for paging is negotiated by a non-access stratum (NAS) signaling.

Figure 1:
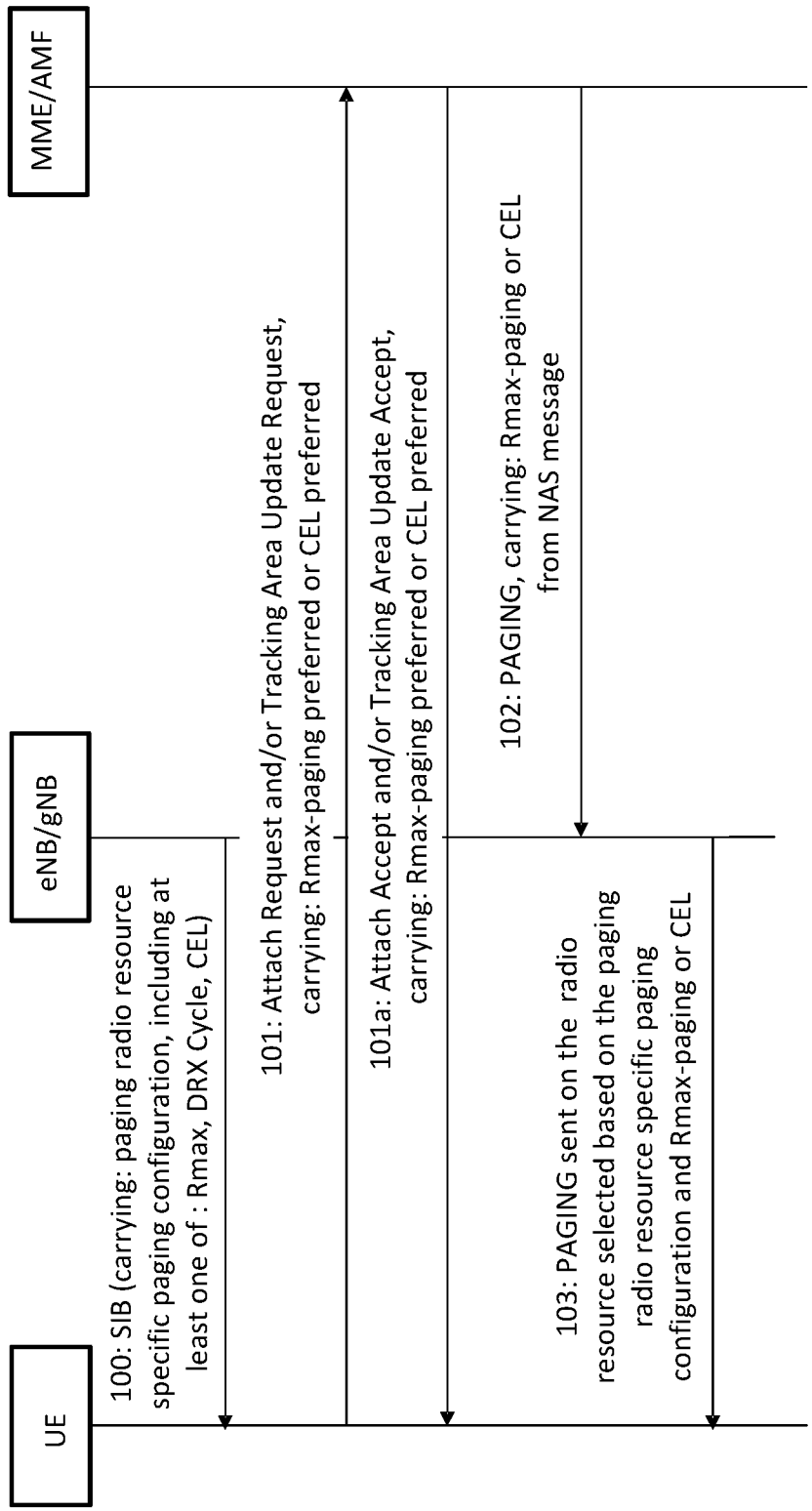
FIG. 1 shows an example of a non-access stratum (NAS) negotiating Rmax-paging.

FIG. 1 shows an example of an NAS negotiating Rmax-paging.

UE receives a paging radio resource specific paging configuration. If UE supports Rmax-paging or CEL-paging based carrier selection, Rmax-paging negotiation (e.g., initial Rmax-paging negotiation) or re-negotiation (e.g., when the Rmax-paging changes for reference signal receive power (RSRP) change) is necessary. Upon receiving the paging radio resource specific paging configuration, the UE can perform operations discussed below. Here, the paging radio resource includes at least one of paging carrier, paging narrowband, paging physical resource block (PRB), paging bandwidth part (BWP), or paging control-resource set (CORESET), paging Rmax, Paging CEL.

In this patent document, the term "paging radio resource specific paging configuration" can be used to indicate any paging radio resource specific paging configuration in any wireless communication environment including eMTC and NR. In some implementations, the term "paging radio resource specific paging configuration" can be used to indicate a paging carrier specific configuration. In other implementations, the term "paging carrier specific configuration" can be used to indicate any type of paging radio resource specific paging configurations.

Step 100: eNB or gNB sends the paging radio resource specific paging configuration by a system information block (SIB) to UE. In some implementations, the paging radio resource specific paging configuration includes at least one of the following: Rmax-paging, paging radio resource specific DRX cycle for paging, the number of POs per paging radio resource specific DRX Cycle (e.g., nB), as will be shown in Table 1 or Table 2 below.

Step 101: UE sends the maximum number of repetitions for NPDCCH common search space (CSS) for paging (e.g., Rmax-paging) preferred, or CEL preferred to a core network (CoreNetwork) by NAS signaling, e.g., by using Attach Request message or Tracking Area Update Request message.

The Rmax-paging, or CEL preferred can be included in a Paging Assistance Information IE, which is further included in the NAS signaling.

Step 101a: the core network acknowledges the maximum number of repetitions for NPDCCH common search space (CSS) for paging (e.g., Rmax-paging) or CEL preferred to UE by NAS signaling. In one example, the core network acknowledges the maximum number of repetitions for NPDCCH common search space (CSS) for paging (e.g., Rmax-paging) to UE by using Attach Accept message or Tracking Area Update Accept message.

The Rmax-paging, or CEL preferred can be included in a Paging Assistance Information IE, which is further included in the NAS signaling.

Step 102: the core network sends PAGING to the base station (eNB or gNB), which includes Rmax-paging or CEL from NAS signaling.

In one example, if Rmax-paging, or CEL preferred from NAS signaling is included in a Paging Assistance Information IE, then the PAGING, or CEL preferred can include the Paging Assistance Information IE directly, and thus the Rmax-paging from NAS signaling is transparent to the core network.

Here, the Rmax-paging, or CEL from NAS signaling is different from the Rmax-paging or CEL from eNB or gNB (e.g., Coverage Enhancement Level, the value of which is expressed with pdcch-NumRepetitionPaging).

Step 103: eNB or gNB sends PAGING on the radio resource selected based on the paging radio resource specific paging configuration and Rmax-paging or CEL from NAS signaling. The selected mechanism will be discussed with reference to FIG. 2.

In Step 101 and Step 102, ValidTimer for Rmax-paging or CEL based paging configuration or ValidTimer for Rmax or CEL based paging configuration can also be carried, and a timer start occasion (e.g., an SFN and/or HSFN related information) may also be included. If carried, ValidTimer for CEL based paging configuration or ValidTimer for Rmax based paging configuration will start at the indicated occasion. The radio resource selection based on Rmax-paging or CEL (e.g., step 103) can only be performed while this timer is running.

In Step 101 and Step 101a, a Rmax or CEL based paging deactivation indication can also be carried to indicate that Rmax or CEL based paging will not be used. In this case, the core network will not include Rmax-paging or CEL from NAS signaling in PAGING to the base station (eNB or gNB).

In another embodiment, if Rmax-paging is not included in step 101, 101a and 102, it implicitly indicate the Rmax based paging deactivation, and Rmax based paging will not be used. In another embodiment, if CEL is not included in steps 101, 101a and 102, it implicitly indicates the CEL based paging deactivation, and CEL based paging will not be used.

Figure 2:
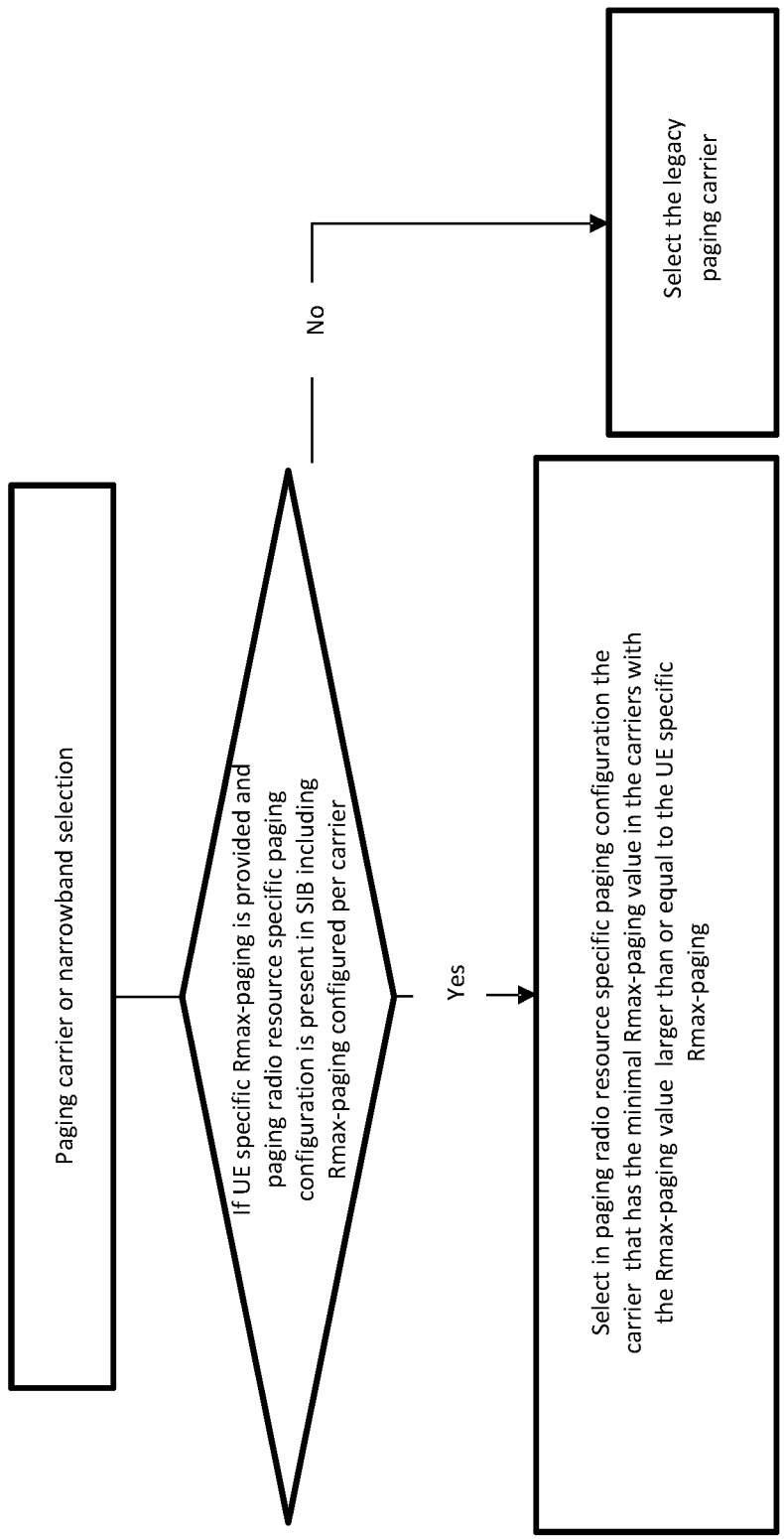
FIG. 2 shows an example of a paging carrier or narrowband selection based on a carrier specific paging configuration and Rmax-paging.

FIG. 2 shows an example of a paging carrier or narrowband selection based on a paging radio resource specific paging configuration and Rmax-paging.

If UE specific Rmax-paging is provided, and paging radio resource specific paging configuration including Rmax-paging configured per carrier is present in SIB, then the paging carrier or narrowband in the paging radio resource specific paging configuration may be selected based on the following rules:

Step 1: select the carriers with Rmax-paging value that is larger than or equal to the UE specific Rmax-paging Step 2: select the carriers with the minimal Rmax-paging value in the carriers selected in Step 1.

Alternative 1: select one carrier from the carriers selected in Step 2, based on UE_ID and paging carrier weight, and if a group wake up signal (GWUS) is configured in the carrier, use GWUS.

Alternative 2: if the UE can monitor GWUS in carriers with paging radio resource specific paging configuration, select the carriers configured with GWUS from the carriers selected in Step 2, and then select one carrier based on UE_ID and paging carrier weight.

Here, this selection procedure is performed by both the base station (eNB/gNB) and user equipment (UE). In one example, the same resource is selected and used by eNB/gNB and UE.

When performed in UE, the UE specific Rmax-paging is provided by NAS signaling or by access stratum (AS) signaling (e.g., by Step 502 below).

When performed in eNB/gNB, the UE specific Rmax-paging is provided by MME (e.g., by Step 102 or Step 503 below).

Suppose UE specific Rmax-paging is 4, and UE can use GWUS, if configured.

Example:

|  | Rmax-paging | GWUS configuration |
|---|---|---|
| Carrier 1 | 2 | Not configured |
| Carrier 2 | 4 | Configured |
| Carrier 3 | 4 | Not configured |
| Carrier 4 | 4 | Configured |
| Carrier 5 | 8 | Configured |
| Carrier 6 | 16 | Not configured |

Carrier Selection Example:

Step 1: select the carrier with Rmax-paging value that is larger than or equal to the UE specific Rmax-paging (4); thus, carrier 2, carrier 3, carrier 4, carrier 5 and carrier 6 are selected.

Step 2: select the carriers with the minimal Rmax-paging value in the carriers selected in Step 1; thus, carrier 2, carrier 3 and carrier 4 are selected.

Alternative 1: UE selects one of the carrier from carrier 2, carrier 3 and carrier 4 based on UE_ID and paging carrier weight. If carrier 2 or carrier 4 is selected, GWUS will be used. If carrier 3 is selected, GWUS will not be used.

Alternative 2: UE selects the carrier configured with GWUS from carrier 2, carrier 3 and carrier 4; thus, carrier 2 and carrier 4 are selected. One of the selected carrier 2 and carrier 4 is selected based on UE_ID and paging carrier weight.

Method 2

In some implementations of the disclosed technology, the maximum number of repetitions for NPDCCH common search space (CSS) for paging (e.g., Rmax-paging) or CEL for paging is negotiated by access stratum (AS) signaling.

Figure 3:
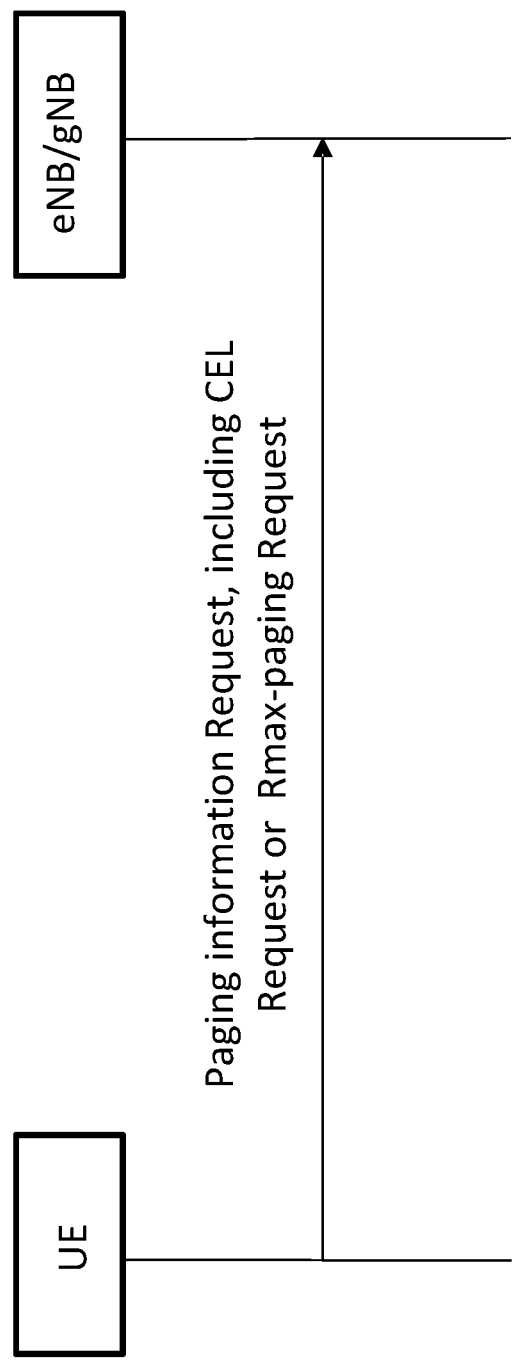
FIG. 3 shows an example of UE paging information request.

FIG. 3 shows an example of UE paging information request.

UE receives a paging radio resource specific paging configuration. If UE supports Rmax-paging or CEL-paging based carrier selection, and Rmax-paging or CEL-paging negotiation (e.g., initial Rmax-paging or CEL-paging negotiation) or re-negotiation (e.g., when the Rmax-paging or CEL-paging changes for RSRP change) is necessary. Upon receiving the paging radio resource specific paging configuration, the UE can perform operations discussed below.

UE sends paging information request to eNB or gNB. In some implementations, the paging information request includes at least one of the coverage enhancement level (CEL) paging preferred, the Rmax-paging preferred, the CEL-paging based paging resource selection capability, the Rmax-paging based paging resource selection capability, CEL based paging deactivating request, or Rmax based paging deactivating request.

The paging information request can be sent by at least one of the following message: UL MAC CE, RRC Connection Reconfiguration Complete, RRC Connection Reestablishment Complete, RRC Connection Resume Complete, RRC Connection Setup Complete, RRC Early Data Request, UE Assistance Information, UE Capability Information, new UL RRC message (e.g., UE Paging Information Request).

Figure 5:
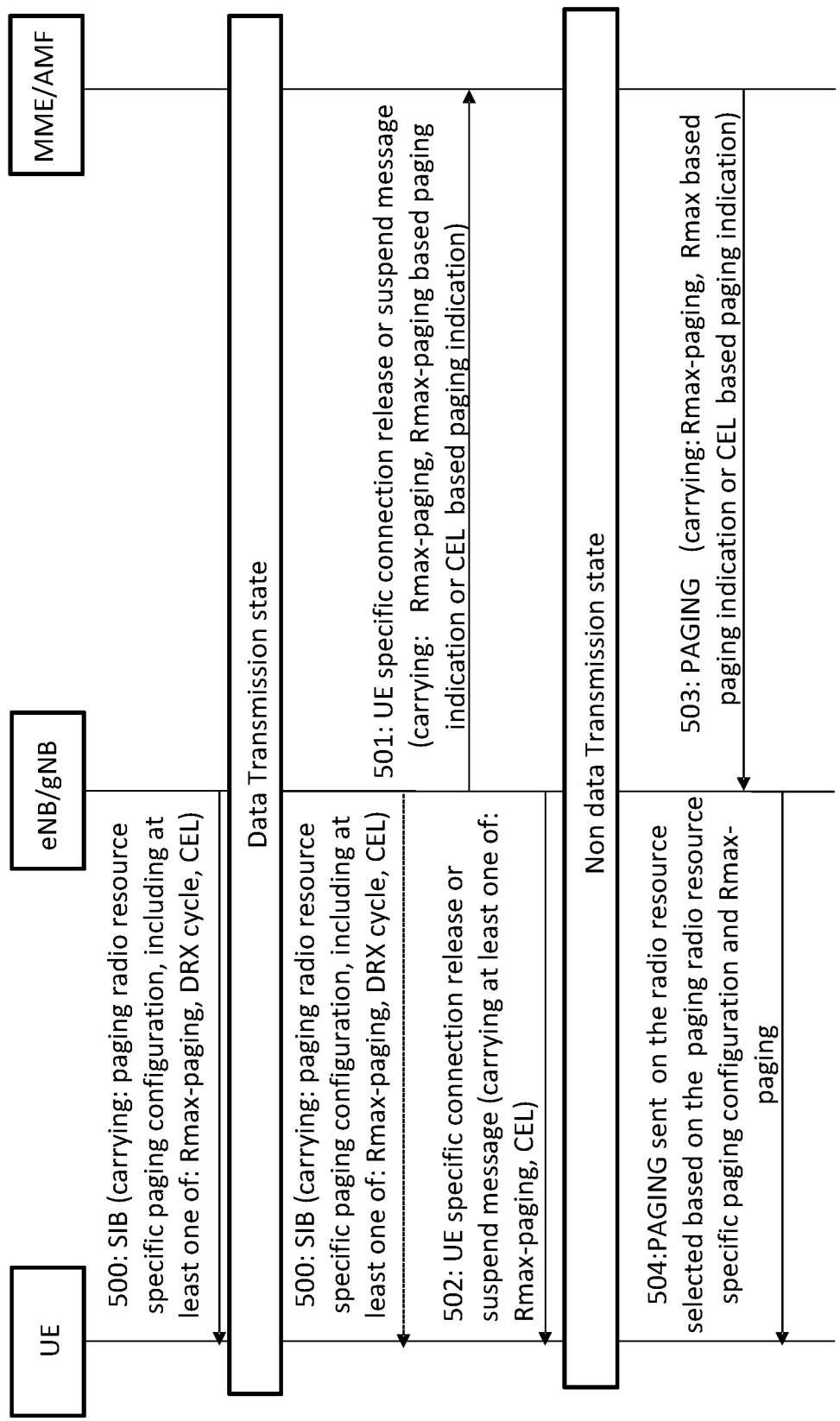
FIG. 5 shows an example of dedicated signaling carrying a carrier specific paging resource configuration.
Figure 6:
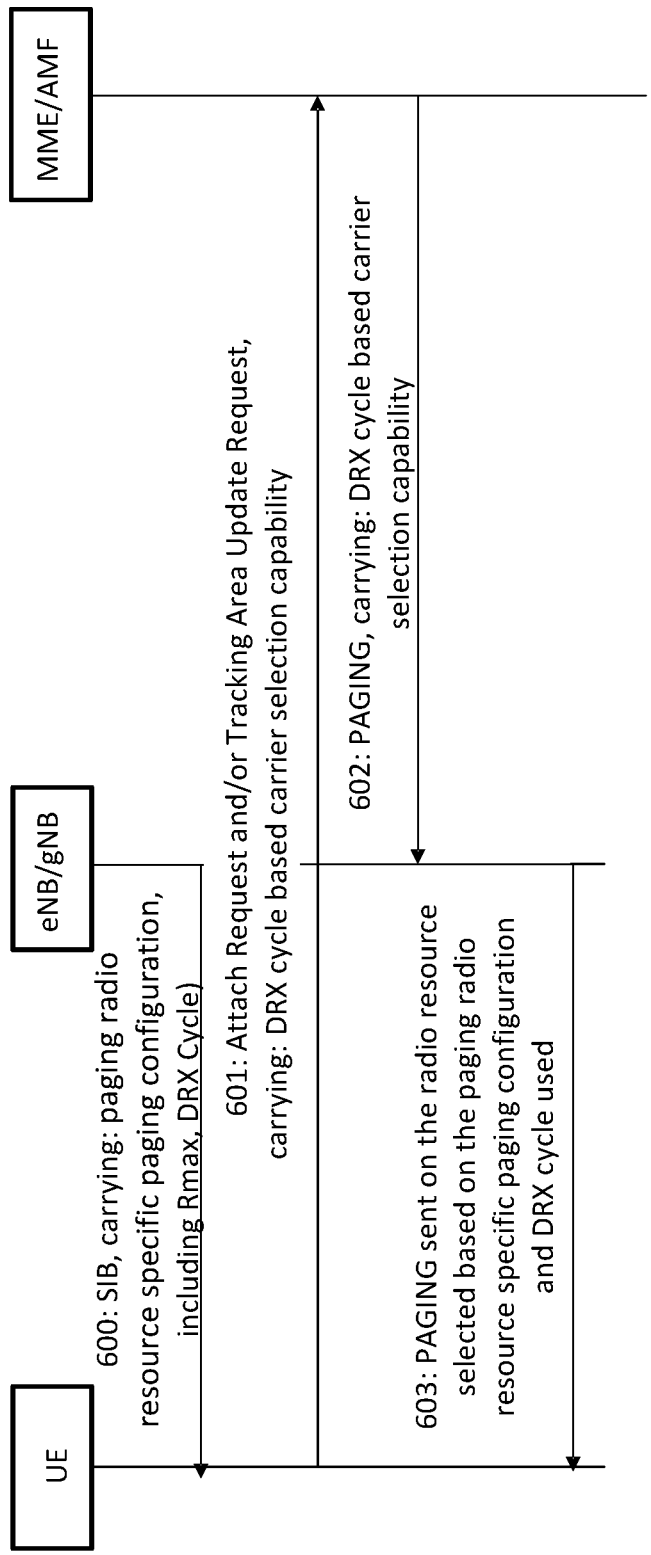
FIG. 6 shows an example of NAS reporting a discontinuous reception (DRX) cycle capability.

The paging information request is used for eNB or gNB to estimate, configure, or release the wireless device specific paging configuration (e.g., in FIGS. 5 and 6). The paging resource includes as least one of the following: the estimated/recommended coverage enhancement level (CEL), the estimated/recommended Rmax-paging, CEL based paging deactivating indication, or Rmax based paging deactivating indication.

In some other embodiment, if Rmax-paging preferred or Rmax-paging based paging resource selection capability is not included in paging information request, it implicitly indicate the Rmax-paging based paging deactivation request, and Rmax-paging based paging will not be used. In some other embodiment, if CEL-paging or CEL-paging based paging resource selection capability is not included in paging information request, it implicitly indicate the CEL-paging based paging deactivation, and CEL based paging will not be used.

In some other embodiment, if Rmax-paging is not included in the wireless device specific paging configuration, it implicitly indicate the Rmax-paging based paging deactivation indication, and Rmax-paging based paging will not be used. In some other embodiment, if CEL-paging is not included in wireless device specific paging configuration, it implicitly indicate the CEL-paging based paging deactivation indication, and CEL based paging will not be used.

Figure 4:
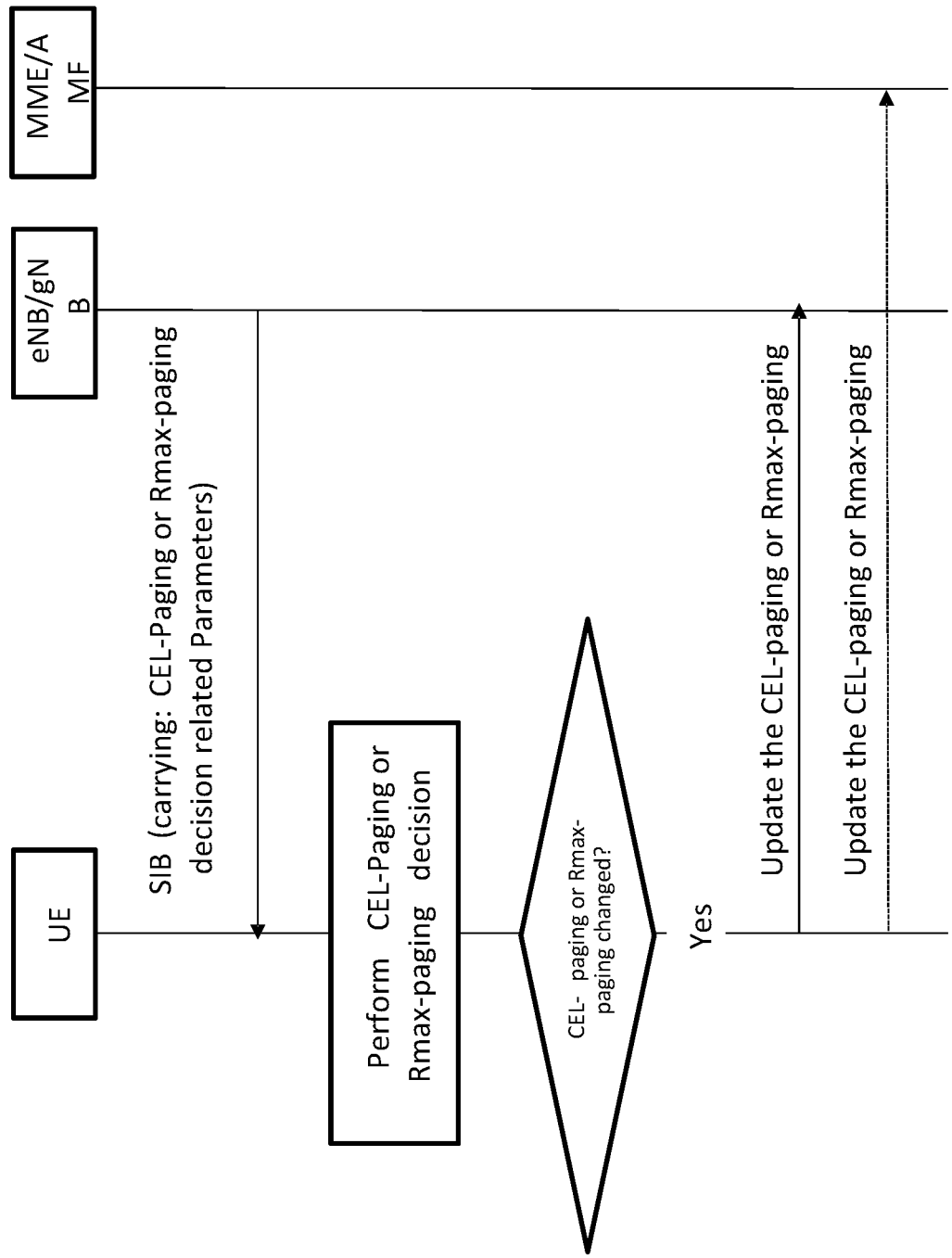
FIG. 4 shows an example of coverage enhancement level (CEL)-paging or Rmax-paging and decision related parameters.

FIG. 4 shows an example of coverage enhancement level (CEL)-paging or Rmax-paging and decision related parameters.

The base station (eNB or gNB) sends CEL-paging or Rmax-paging decision related parameters to UE by a system information block (SIB). In some implementations, examples of the CEL-paging or Rmax-paging decision related parameters may include RSRP thresholds corresponding to different CELs for paging, RSRP thresholds corresponding to different Rmax for paging, Qoffset or Hysteresis for CEL change, Qoffset or Hysteresis for Rmax change, Trigger Timer for CEL change, and Trigger Timer for Rmax change.

UE can make decisions associated with CEL-Paging or Rmax-paging based on the related parameters as discussed below.

In some implementations, UE can decide the initial CEL-paging or initial Rmax-paging based on the measured RSRP and RSRP thresholds.

In some implementations, UE uses the following information to decide the CEL-paging or Rmax-paging change: (1) Qoffset or Hysteresis for CEL change, Qoffset or Hysteresis for Rmax change as the RSRP change margin; (2) Qoffset or Hysteresis for CEL change, Qoffset or Hysteresis for Rmax change as the CEL change or Rmax change trigger time; and (3) the CEL-paging or Rmax-paging change only when the measured RSRP cross the RSRP threshold with the amount over the margin, and lasting at least for the trigger time.

In some implementations, the base station (e.g., eNB or gNB) provides the following configurations.

Suppose two RSRP thresholds are configured to decide the initial CEL-paging as follows. RSRP Threshold1: −100 dBm, RSRP Threshold2: −110 dBm, Hysteresis for CEL change: 3 dB, TriggerTimer for CEL change: 2 seconds.

If the measured RSRP is smaller than −110 dBm, the UE is considered to be in CEL2. If the measured RSRP is smaller than −100 dBm, the UE is considered to be in CELL In all other cases, the UE is considered to be in CEL0.

For the initial CEL decision when the UE in CEL 1, if, during at least 2 seconds, the measured RSRP is smaller than −113 dBm (−110 dBm −3 dB), then the UE is considered to be changed from CEL1 to CEL2. If, during at least 2 seconds, the measured RSRP is larger than −97 dBm (−100 dBm+3 dB), then the UE is considered to be changed into CEL0. The same rules can be used for Rmax-paging decision.

Upon decision that CEL-paging or Rmax-paging changes, the UE may request the core network (CN) to update the CEL-paging or Rmax-paging (e.g., Step 101), or the UE may request the base station (eNB or gNB) to update the CEL-paging or Rmax-paging (e.g., FIG. 3).

FIG. 5 shows an example of dedicated signaling carrying a paging radio resource specific paging resource configuration.

The eNB or gNB estimates the Rmax-paging for UE based on a data transmission state (e.g., RRC_CONNECTED state, RRC_INACTIVE state, PUR transmission procedure, EDT transmission procedure, NR small data transmission procedure), which can be based on the UE paging information request, as shown in FIG. 3. Subsequently, the base station (e.g., eNB or gNB) provides the estimated/recommended Rmax-paging to the core network (CN) and UE.

Step 500: eNB or gNB sends the paging radio resource specific paging configuration by SIB to UE. In some implementations, the paging radio resource specific paging configuration includes at least one of the following: Rmax-paging, paging radio resource specific DRX cycle for paging, the number of POs per paging radio resource specific DRX Cycle (e.g., nB). The corresponding configuration is shown in Table 1 or Table 2 below.

Step 501: upon releasing, by eNB or gNB, the UE specific S1AP/NGAP connection, one of the following messages can be transmitted to the core network such as Mobility Management Entity (MME) or Access and Mobility Management Function (AMF): UE CONTEXT SUSPEND REQUEST, UE CONTEXT RELEASE COMPLETE, or UE CONTEXT RESUME REQUEST with fast RRC release indication, the message to CN includes: Rmax-paging, Rmax-paging based paging indication or CEL based paging indication.

Step 502: upon releasing, by eNB or gNB, the Uu RRC connection, one of the following messages can be transmitted to UE: RRC Connection Release, RRC Early Data Complete, DCI or DL MAC CE. The message to UE includes at least one of the following: Rmax-paging, and CEL.

Step 503: the core network sends a paging message (PAGING) to the base station (e.g., eNB or gNB), including Rmax-paging, Rmax-paging based paging indication or CEL based paging indication, sent to the core network in Step 501.

Step 504: If the paging message (PAGING) from the core network includes Rmax-paging based paging indication or CEL based paging indication, eNB or gNB sends a paging message (PAGING) on the radio resource selected based on the paging radio resource specific paging configuration and Rmax-paging. The radio resource selection procedure can be performed as discussed above with reference to FIG. 2.

In some implementations, the Rmax-paging based paging indication or CEL based paging indication is used to differentiate whether to use Rmax-paging based paging carrier selection, since the Rmax-paging can already be included in legacy PAGING from the core network (CN).

In Step 501, Step 502, and Step 503, Valid Timer for CEL based paging configuration or Valid Timer for Rmax based paging configuration can also be carried, and a timer start occasion (e.g., SFN and/or HSFN related information) may also be included. If carried, Valid Timer for CEL based paging configuration or Valid Timer for Rmax based paging configuration will start at the indicated occasion. The radio resource selection based on Rmax-paging (e.g., Step 503) can only be performed while this timer is running.

Method 3

In some implementations of the disclosed technology, DRX cycle based carrier selection capability can be reported by NAS.

FIG. 6 shows an example of NAS reporting a discontinuous reception (DRX) cycle capability.

Step 600: eNB or gNB sends the paging radio resource specific paging configuration by SIB to UE. In some implementations, the paging radio resource specific paging configuration includes at least one of the following: Rmax-paging, paging radio resource specific DRX cycle for paging, the number of POs per carrier specific DRX cycle (e.g., nB). The configuration is shown in Table 1 or Table 2 below.

Step 601: UE sends the DRX cycle based carrier selection capability to the core network by NAS signaling. In some implementation, UE sends the DRX cycle based carrier selection capability to the core network using Attach Request message or Tracking Area Update Request message.

The DRX cycle based carrier selection capability can be included in a Paging Assistance Information IE, which is further included in the NAS signaling.

Step 602: The core network sends a paging message (PAGING) to the base station (e.g., eNB or gNB), which includes DRX cycle based carrier selection capability.

In some implementations, if DRX cycle based carrier selection capability from NAS signaling is included in a Paging Assistance Information IE, then the paging message (PAGING) can include the Paging Assistance Information IE directly, and thus the DRX cycle based carrier selection capability from NAS signaling is transparent to the core network.

Step 603: eNB or gNB sends a paging message (PAGING) on the radio resource selected based on the paging radio resource specific paging configuration and DRX cycle that UE used. The selected procedure can be performed as will be discussed below with reference to FIG. 7.

Figure 7:
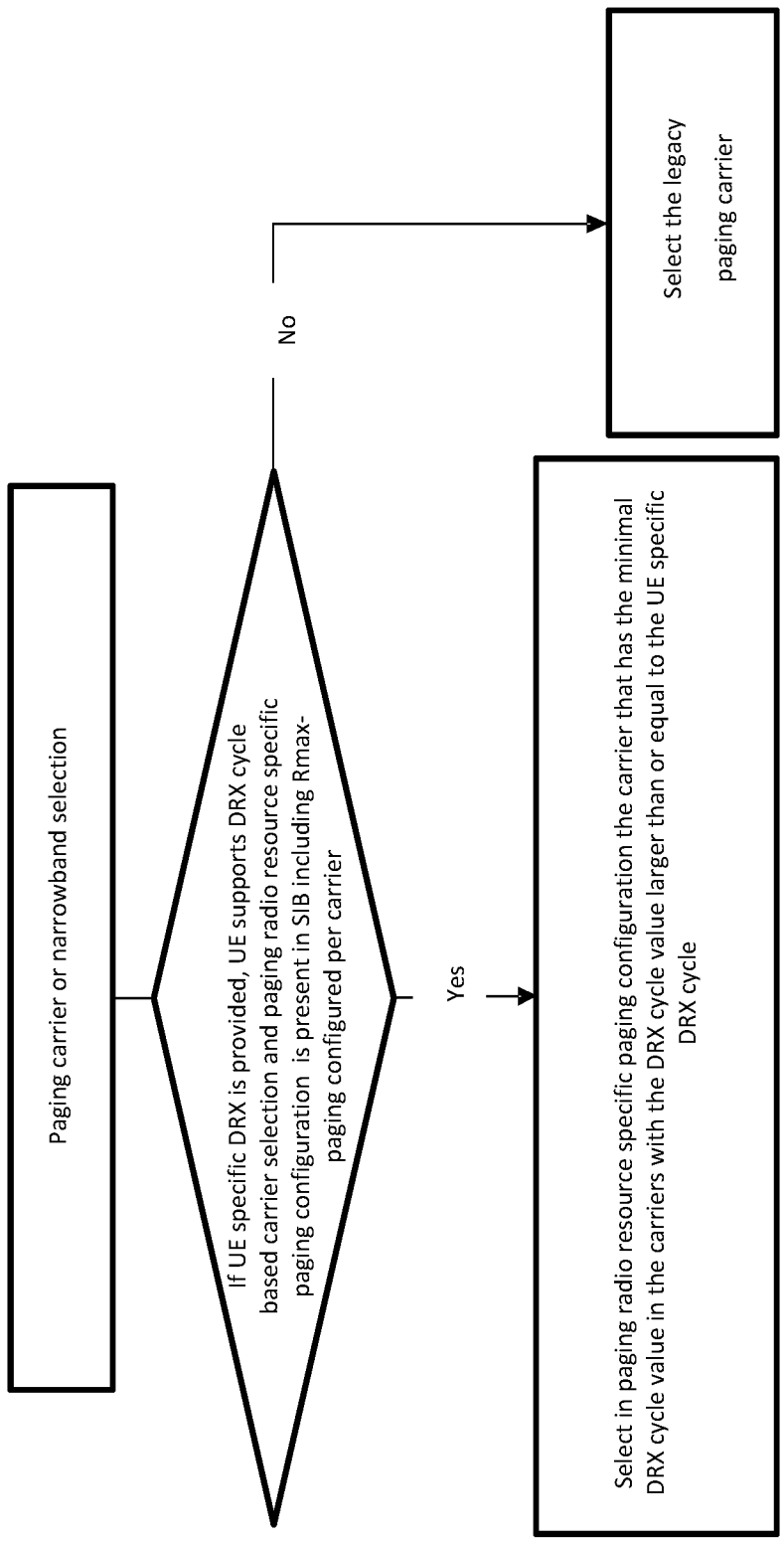
FIG. 7 shows paging carrier or narrowband selection based on the carrier specific paging configuration and UE specific DRX cycle.

FIG. 7 shows paging carrier or narrowband selection based on the paging radio resource specific paging configuration and UE specific DRX cycle.

If UE specific DRX cycle is provided and UE supports DRX cycle based carrier selection, and paging radio resource specific paging configuration including DRX cycle per carrier is present in a system information block (SIB), then the paging carrier with the paging radio resource specific paging configuration may be selected using the following rules:

Step 1: select the carriers with DRX cycle value that is larger than or equal to the UE specific DRX cycle.

Step 2: select the carriers with the minimal DRX cycle value in the carriers selected in Step 1.

Alternative 1: one carrier is selected from the carriers selected in Step 2, based on UE_ID and paging carrier weight, and if GWUS is configured in the carrier, use GWUS.

Alternative 2: if the UE can monitor GWUS in carriers with paging radio resource specific paging configuration, the carriers configured with GWUS is selected from the carriers selected in Step 2, and then one carrier is selected based on UE_ID and paging carrier weight.

Suppose UE specific DRX cycle is rf64, and UE can use GWUS, if configured.

Example:

|  | DRX cycle per carrier | GWUS configuration |
|---|---|---|
| Carrier 1 | rf32 | Not configured |
| Carrier 2 | rf64 | Configured |
| Carrier 3 | rf64 | Not configured |
| Carrier 4 | rf64 | Configured |
| Carrier 5 | rf128 | Configured |
| Carrier 6 | rf1024 | Not configured |

Carrier Selection Example:

Step 1: select the carrier with DRX cycle value that is larger than or equal to the UE specific DRX cycle (rf64); thus, carrier 2, carrier 3, carrier 4, carrier 5 and carrier 6 are selected.

Step 2: select the carriers with the minimal DRX cycle value in the carriers selected in Step 1; thus, carrier 2, carrier 3 and carrier 4 are selected.

Alternative 1: UE selects one of the carrier from carrier 2, carrier 3 and carrier 4 based on UE_ID and paging carrier weight. If carrier 2 or carrier 4 is selected, GWUS will be used. If carrier 3 is selected, GWUS will not be used.

Alternative 2: UE select the carrier configured with GWUS from carrier 2, carrier 3 and carrier 4; thus, carrier 2 and carrier 4 are selected. One of the selected carrier 2 and carrier 4 is selected based on UE_ID and paging carrier weight.

In some implementations, this selection procedure is performed by both eNB/gNB and UE. In one example, the same resource is selected and used by eNB/gNB and UE.

When performed in UE, the DRX cycle based carrier selection capability is provided by NAS (e.g., by step 601) or UE AS.

When performed in eNB/gNB, the UE specific Rmax-paging is provided by MME (e.g., by step 602 or step 803).

Method 4

In some implementations of the disclosed technology, DRX cycle based carrier selection capability can be reported by access stratum (AS).

Figure 8:
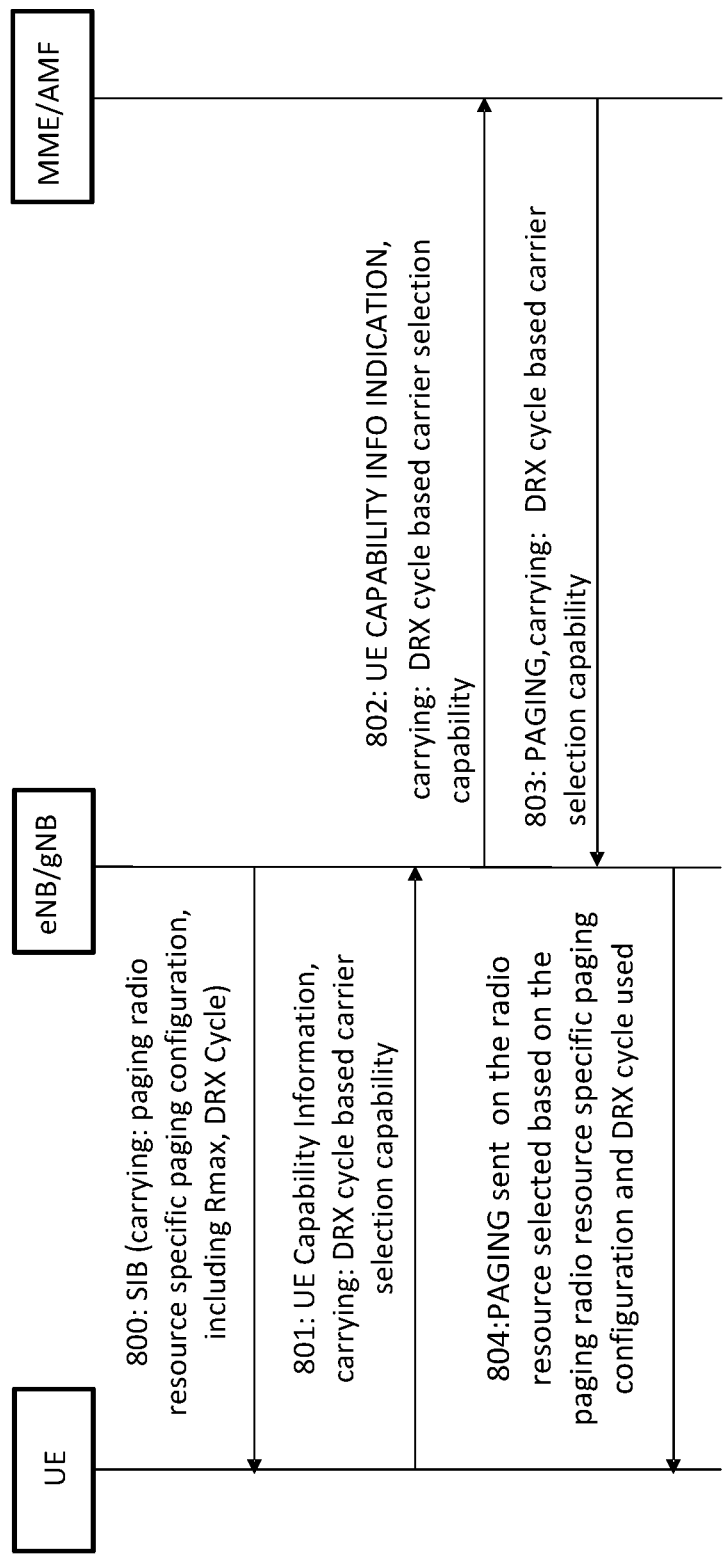
FIG. 8 shows an example of access stratum (AS) reporting a discontinuous reception (DRX) cycle capability.

FIG. 8 shows an example of access stratum (AS) reporting a discontinuous reception (DRX) cycle capability.

Step 800: eNB or gNB sends the paging radio resource specific paging configuration by SIB to UE. In some implementations, the paging radio resource specific paging configuration includes at least one of the following: Rmax-paging, paging radio resource specific DRX cycle for paging, the number of POs per paging radio resource specific DRX cycle (e.g., nB). The configuration is shown in Table 1 or Table 2 below.

Step 801: UE sends the DRX cycle based carrier selection capability to the base station (e.g., eNB or gNB) by AS signaling. In some implementation, UE sends the DRX cycle based carrier selection capability to the base station (e.g., eNB or gNB) using UE Capability Information message.

The DRX cycle based carrier selection capability can be included in a ue-RadioPagingInfo IE, which is further included in the AS signaling.

Step 802: the base station (e.g., eNB or gNB) sends the DRX cycle based carrier selection capability to the core network (e.g., MME or AMF) by S1AP or NGAP signaling, e.g., UE CAPABILITY INFO INDICATION message.

The DRX cycle based carrier selection capability can be included in a UE Radio Capability for Paging IE, which is further included in the S1AP or NGAP signaling.

Step 803: The core network sends a paging message (PAGING) to the base station (e.g., eNB or gNB), which includes DRX cycle based carrier selection capability.

In some implementations, DRX cycle based carrier selection capability is included in a UE Radio Capability for Paging IE, which is further included in a paging message (PAGING), and thus the DRX cycle based carrier selection capability from NAS signaling is transparent to the core network.

Step 804: eNB or gNB sends a paging message (PAGING) on the radio resource selected based on the paging radio resource specific paging configuration and DRX cycle that UE used. The selected mechanism can be implemented as discussed above with reference to FIG. 7.

Figure 9:
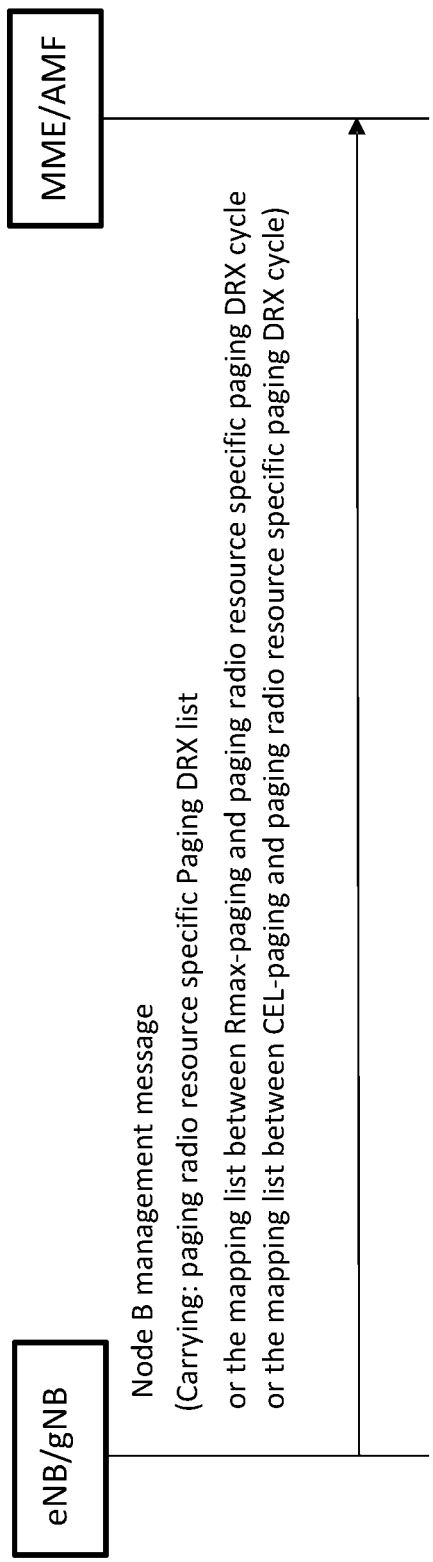
FIG. 9 shows an example of a discontinuous reception (DRX) list.

FIG. 9 shows an example of a discontinuous reception (DRX) list.

To avoid excessive PAGING caching in eNB/gNB, the core network (CN) sends paging to eNB/gNB just before the Paging Occasion (PO). Considering that the PO is calculated based on the DRX cycle, if multiple DRX cycles are configured (e.g., DRX cycle is configured per paging carrier or per paging NarrowBand) in one eNB/gNB, all these multiple DRX cycles are provided to the core network (CN) by a base management message (e.g., NodeB management message).

If the UE specific DRX cycle based paging carrier selection is supported, the paging radio resource specific paging DRX list is provided, and each item of the list includes one DRX cycle. The core network (CN) decides the paging sending occasion based on the DRX cycle, which is obtained by matching the UE specific DRX cycle and the paging radio resource specific paging DRX list.

If Rmax-paging based paging carrier selection is supported, the mapping list indicating the mapping between Rmax-paging and paging radio resource specific paging DRX cycle is provided, and each item of the list includes the mapping between Rmax-paging and the paging radio resource specific paging DRX cycle. The core network (CN) decides the paging sending occasion based on the DRX cycle, which is obtained by matching the Rmax-paging and the mapping list.

If CEL-paging based paging carrier selection is supported, the mapping list indicating the mapping between CEL-paging and paging radio resource specific paging DRX cycle is provided, and each item of the list includes the mapping between CEL-paging and paging radio resource specific paging DRX cycle. The core network (CN) decides the paging sending occasion based on the DRX cycle, which is obtained by matching the CEL-paging and the mapping list.

In some implementations, at least one of paging radio resource specific paging DRX list, the mapping list between Rmax-paging and paging radio resource specific paging DRX cycle, or the mapping list between CEL-paging and paging radio resource specific paging DRX cycle is included in the message of: S1 SETUP REQUEST, ENB CONFIGURATION UPDATE, NG SETUP REQUEST, RAN CONFIGURATION UPDATE), which is used by MME to decide the paging message (PAGING) sending occasion based on UE specific DRX.

Table 1 below shows an example of the carrier specific paging configuration in SIB, in which: a new paging carrier configuration list (paging-ConfigList-r17) is defined; and in each list item, Rmax-paging, DRX cycle and/or number of POs can be configured.

Table 2 below shows an example of the carrier specific paging configuration in SIB, in which: a new carrier specific pcch configuration (pcch-Config-r17) is defined in DL carrier; and in the configuration, Rmax-paging, DRX cycle and/or number of POs can be configured.

In some implementations, if the paging-ConfigList-r17 or pcch-Config-r17 is present in SystemInformationBlockType22-NB-r14, it means that carrier specific paging configuration is included in SIB.

In some implementations, the paging-ConfigList-r17 can include multiple Paging-ConfigCommon-NB-r17 item, and each item includes Paging-ConfigCommon-r17, which can further include at least one of dl-CarrierConfig-r14, or pcch-Config-r14.

Here, the dl-CarrierConfig-r14 provides the carrier configuration. Thus, each Paging-ConfigCommon-NB-r17 item relates to one carrier, which means that the Paging-ConfigCommon-NB-r17 is carrier specific configuration.

In addition, the pcch-Config-r14 includes npdcch-NumRepetitionPaging-r14, which is the Rmax-Paging configured per carrier.

In some implementations, the paging-ConfigList-r17 can include multiple Paging-ConfigCommon-NB-r17 item, and each item includes defaultPagingCyclePerCarrier-r17, which is the DRX Cycle configured per carrier.

In some implementations, the paging-ConfigList-r17 can include multiple Paging-ConfigCommon-NB-r17 item, and each item includes nB-r17, which is the number of POs configured per carrier specific DRX Cycle.

Since the Rmax-Paging, DRX Cycle and number of POs per carrier specific DRX Cycle in paging-ConfigList-r17 is configured per carrier and will not be used by legacy UE, different Rmax-Paging, DRX Cycle and/or number of POs per carrier specific DRX cycle can be set for UEs in different CELs.

In some implementations, the pcch-Config-r17 can be included in DL-ConfigCommon-NB-r14. Since DL-ConfigCommon-NB-r14 is configured per carrier, the pcch-Config-r17 is carrier specific configuration.

In addition, the pcch-Config-r17 includes npdcch-NumRepetitionPaging-r17, which is the Rmax-Paging configured per carrier.

In some implementations, the pcch-Config-r17 can include defaultPagingCycle-r17, which is the DRX Cycle configured per carrier.

In some implementations, the pcch-Config-r17 can include nB-r17, which is the number of POs configured per carrier specific DRX Cycle.

Since the Rmax-Paging, DRX Cycle and number of POs per carrier specific DRX Cycle in pcch-Config-r17 is configured per carrier and will not be used by legacy UE, different Rmax-Paging, DRX Cycle and/or number of POs per carrier specific DRX cycle can be set for UEs in different CELs.

TABLE 1

```
SystemInformationBlockType22-NB-r14 ::= SEQUENCE {
    dl-ConfigList-r14           DL-ConfigCommonList-NB-r14 OPTIONAL, -- Need OR
    ul-ConfigList-r14           UL-ConfigCommonList-NB-r14 OPTIONAL, -- Need OR
    pagingWeightAnchor-r14      PagingWeight-NB-r14 OPTIONAL, -- Cond pcch-config
    nprach-ProbabilityAnchorList-r14
    NPRACH-ProbabilityAnchorList-NB-r14 OPTIONAL, -- Cond nprach-config
    lateNonCriticalExtension    OCTET STRING OPTIONAL,
    ...,
    [[ mixedOperationModeConfig-r15 SEQUENCE {
        dl-ConfigListMixed-r15      DL-ConfigCommonList-NB-r14 OPTIONAL, -- Cond dl-ConfigList
        ul-ConfigListMixed-r15      UL-ConfigCommonList-NB-r14 OPTIONAL, -- Cond ul-ConfigList
        pagingDistribution-r15      ENUMERATED {true} OPTIONAL, -- Need OR
        nprach-Distribution-r15     ENUMERATED {true} OPTIONAL -- Need OR
    }                               OPTIONAL, -- Need OR
    ul-ConfigList-r15           UL-ConfigCommonListTDD-NB-r15 OPTIONAL - Cond TDD
    ]]
    [[paging-ConfigList-r17     Paging-ConfigCommonList-NB-r17 OPTIONAL, -- Need OR]]
}
Paging-ConfigCommonList-NB-r17 ::= SEQUENCE (SIZE (1.. maxNonAnchorCarriers-NB-r14)) OF
                                Paging-ConfigCommon-NB-r17
Paging-ConfigCommon-NB-r17 ::=  SEQUENCE {
    Paging-ConfigCommon-r17     DL-ConfigCommonList-NB-r14 OPTIONAL
    defaultPagingCyclePerCarrier-r17
    ENUMERATED {rf32, rf64, rf128, rf256, rf512, rf1024}
    OPTIONAL, -- Need OR,
    nB-PerCarrier-r17                   ENUMERATED {
                                    fourT, twoT, oneT, halfT, quarterT, one8thT,
                                    one16thT, one32ndT, one64thT,
                                    one128thT, one256thT, one512thT, one1024thT,
                                    spare3, spare2, spare1 } OPTIONAL, -- Need OR,
}
DL-ConfigCommonList-NB-r14 ::= SEQUENCE (SIZE (1.. maxNonAnchorCarriers-NB-r14)) OF
                                DL-ConfigCommon-NB-r14
```

TABLE 1-continued

```
UL-ConfigCommonList-NB-r14 ::= SEQUENCE (SIZE (1.. maxNonAnchorCarriers-NB-r14)) OF
                                  UL-ConfigCommon-NB-r14
UL-ConfigCommonListTDD-NB-r15 ::= SEQUENCE (SIZE (1.. maxNonAnchorCarriers-NB-r14)) OF
                                  UL-ConfigCommonTDD-NB-r15
DL-ConfigCommon-NB-r14 ::=      SEQUENCE {
  dl-CarrierConfig-r14          DL-CarrierConfigCommon-NB-r14,
  pcch-Config-r14               PCCH-Config-NB-r14 OPTIONAL, -- Need OR
  ...,
  [[ wus-Config-r15             WUS-ConfigPerCarrier-NB-r15 OPTIONAL -- Cond WUS
  ]],
  [[ gwus-Config-r16            WUS-ConfigPerCarrier-NB-r15 OPTIONAL -- Cond GWUS
  ]]
}
PCCH-Config-NB-r14 ::=          SEQUENCE {
  npdcch-NumRepetitionPaging-r14
  ENUMERATED {
                                r1, r2, r4, r8, r16, r32, r64, r128,
                                r256, r512, r1024, r2048,
                                spare4, spare3, spare2, spare1} OPTIONAL, -- Need OP
  pagingWeight-r14              PagingWeight-NB-r14 DEFAULT w1,
  ...
}
PagingWeight-NB-r14 ::=         ENUMERATED { w1, w2, w3, w4, w5, w6, w7, w8,
                                w9, w10, w11, w12, w13, w14, w15, w16}
```

SystemInformationBlockType22-NB field descriptions defaultPagingCyclePerCarrier
Default paging cycle configured per carrier, used to derive
'T' in TS 36.304 [4]. Value rf132 corresponds to 32 radio
frames, rf64 corresponds to 64radio frames and so on. If absent, the
value of defaultPagingCycle in SIB2 is applied
nB-PerCarrier
Parameter: nB-PerCarrier is used as one of per carrier parameters to
derive the Paging Frame and Paging Occasion according to TS 36.304 [4].
Value in multiples of 'T' as defined in TS 36.304 [4]. A value of
fourT corresponds to 4 * T, a value of twoT corresponds to 2 * T
and so on. If absent, the value of nB in SIB2 is applied.

TABLE 2

```
SystemInformationBlockType22-NB-r14 ::= SEQUENCE {
dl-ConfigList-r14               DL-ConfigCommonList-NB-r14 OPTIONAL, -- Need OR
ul-ConfigList-r14               UL-ConfigCommonList-NB-r14 OPTIONAL, -- Need OR
pagingWeightAnchor-r14          PagingWeight-NB-r14 OPTIONAL, -- Cond pcch-config
nprach-ProbabilityAnchorList-r14
NPRACH-ProbabilityAnchorList-NB-r14 OPTIONAL, -- Cond nprach-config
lateNonCriticalExtension        OCTET STRING OPTIONAL,
...,
[[ mixedOperationModeConfig-r15 SEQUENCE {
    dl-ConfigListMixed-r15      DL-ConfigCommonList-NB-r14 OPTIONAL, -- Cond dl-ConfigList
    ul-ConfigListMixed-r15      UL-ConfigCommonList-NB-r14 OPTIONAL, -- Cond ul-ConfigList
    pagingDistribution-r15      ENUMERATED {true} OPTIONAL, -- Need OR
    nprach-Distribution-r15     ENUMERATED {true} OPTIONAL -- Need OR
  }                             OPTIONAL, -- Need OR
  ul-ConfigList-r15             UL-ConfigCommonListTDD-NB-r15 OPTIONAL -- Cond TDD
]]
}
DL-ConfigCommonList-NB-r14 ::= SEQUENCE (SIZE (1.. maxNonAnchorCarriers-NB-r14)) OF
                                DL-ConfigCommon-NB-r14
UL-ConfigCommonList-NB-r14 ::= SEQUENCE (SIZE (1.. maxNonAnchorCarriers-NB-r14)) OF
UL-ConfigCommon-NB-r14
UL-ConfigCommonListTDD-NB-r15 ::= SEQUENCE (SIZE (1.. maxNonAnchorCarriers-NB-r14)) OF
                                UL-ConfigCommonTDD-NB-r15
DL-ConfigCommon-NB-r14 ::=      SEQUENCE {
  dl-CarrierConfig-r14          DL-CarrierConfigCommon-NB-r14,
  pcch-Config-r14               PCCH-Config-NB-r14 OPTIONAL, -- Need OR
  ...,
  [[ wus-Config-r15             WUS-ConfigPerCarrier-NB-r15 OPTIONAL -- Cond WUS
  ]],
  [[ gwus-Config-r16            WUS-ConfigPerCarrier-NB-r15 OPTIONAL -- Cond GWUS
  ]]
  [[
   pcch-Config-r17              PCCH-Config-NB-r17 OPTIONAL -- Cond pcch-Config-r14
  ]]
}
PCCH-Config-NB-r17 ::=          SEQUENCE {
```

TABLE 2-continued

```
npdcch-NumRepetitionPaging-r17    ENUMERATED {
                                    r1, r2, r4, r8, r16, r32, r64, r128,
                                    r256, r512, r1024, r2048,
                                    spare4, spare3, spare2, spare1 } OPTIONAL, -- Need OP
pagingWeight-r17                  PagingWeight-NB-r14 DEFAULT w1,
[[
defaultPagingCycle-r17            ENUMERATED {rf32, rf64, rf128,
rf256, rf512, rf1024} OPTIONAL,  -- Need OR,
nB-r17                            ENUMERATED {
                                    fourT, twoT, oneT, halfT, quarterT, one8thT,
                                    one16thT, one32ndT, one64thT,
                                    one128thT, one256thT, one512thT, one1024thT,
                                    spare3, spare2, spare1 } OPTIONAL, -- Need OR,
]]
...
}
PagingWeight-NB-r14 ::=           ENUMERATED {w1, w2, w3, w4, w5, w6, w7, w8,
                                    w9, w10, w11, w12, w13, w14, w15, w16}
```

| SystemInformationBlockType22-NB field descriptions |
| --- |
| pcch-Config<br>Configure the PCCH parameters for the non-anchor DL carrier.<br>If pcch-Config-r17 is configured in a cell, the UE supporting<br>paging carrier selection based on the carrier specific<br>paging parameter will only select the carrier with<br>pcch-Config-r17 configured for paging. The UE not supporting<br>paging carrier selection based on the carrier specific paging parameter<br>does not select the carrier with pcch-Config-r17 configured for paging. |

| Conditional presence | Explanation |
| --- | --- |
| pcch-Config-r14 | This field is optionally present, Need OR, if the field pcch-Config-r14 is absent. Otherwise the field is not present. |

Method 5

In some implementations of the disclosed technology, paging carries UE-specific radio resources configuration.

UE specific paging resource (e.g., Rmax-paging or CEL for paging) configuration provision is suitable for the following two cases.

Case 1: UE is an Enhanced Coverage Restricted UE, in which case Rmax-paging is always fixed (UE in CEL 0), but UE may move between cells.

Case 2: UE is a geostationary, in which case UE will stay in one cell, thus UE specific dedicated resource configuration can be provided in a paging message (PAGING).

Thus, if a paging message (PAGING) from MME/AMF carries UE specific paging resource configuration (Step 1001), and the UE is not an Enhanced Coverage Restricted UE (whether the UE is an Enhanced Coverage Restricted UE is indicated by the Enhanced Coverage Restricted IE in PAGING), based on which base station (eNB or gNB) can decide the cell that the UE is geostationary.

The base station (e.g., eNB or gNB) can configure UE specific/dedicated radio resource in the paging message (PAGING) transmitted to UE. Here, the UE specific/dedicated radio resource includes at least one of Msg A resource, Contention Free Random Access resource (CFRA), multiple CFRA resource related multiple cell beams or multiple SSBs, respectively, UL resource grant for UL transmission (e.g., Msg3 transmission), UE specific RNTI (e.g., C-RNTI), UE specific PDCCH search space. (step 1003), Contention Based Random Access (CBRA) related information; essential SI information for MT-access, or MT-access related information in cell-free cases.

Upon receiving the UE specific/dedicated radio resource in the paging message (PAGING), UE can perform the UL transmission based on the UE specific/dedicated radio resource. In some implementations, UE may perform 2-step physical random access channel (PRACH) procedure (transmission MsgA for 2-step PRACH), perform a contention-free random access (CFRA) procedure (Msg1), transmit Msg3 on the UL grant and/or monitor the PDCCH associated with the UE specific RNTI on the UE specific PDCCH search (Step 1004).

Where the Msg 3 includes the EDT Msg3, PUR Msg3 or RRC Msg3, at least one of the following RRC messages can be included: RRC Early Data Request, RRC Connection Request, RRC Connection Resume Request. If multiple CFRA resource related multiple cell beams or multiple SSBs respectively is provided in the paging message (PAGING), UE selects one of them based on the selected cell beam to send Msg1 or MsgA.

Figure 10:
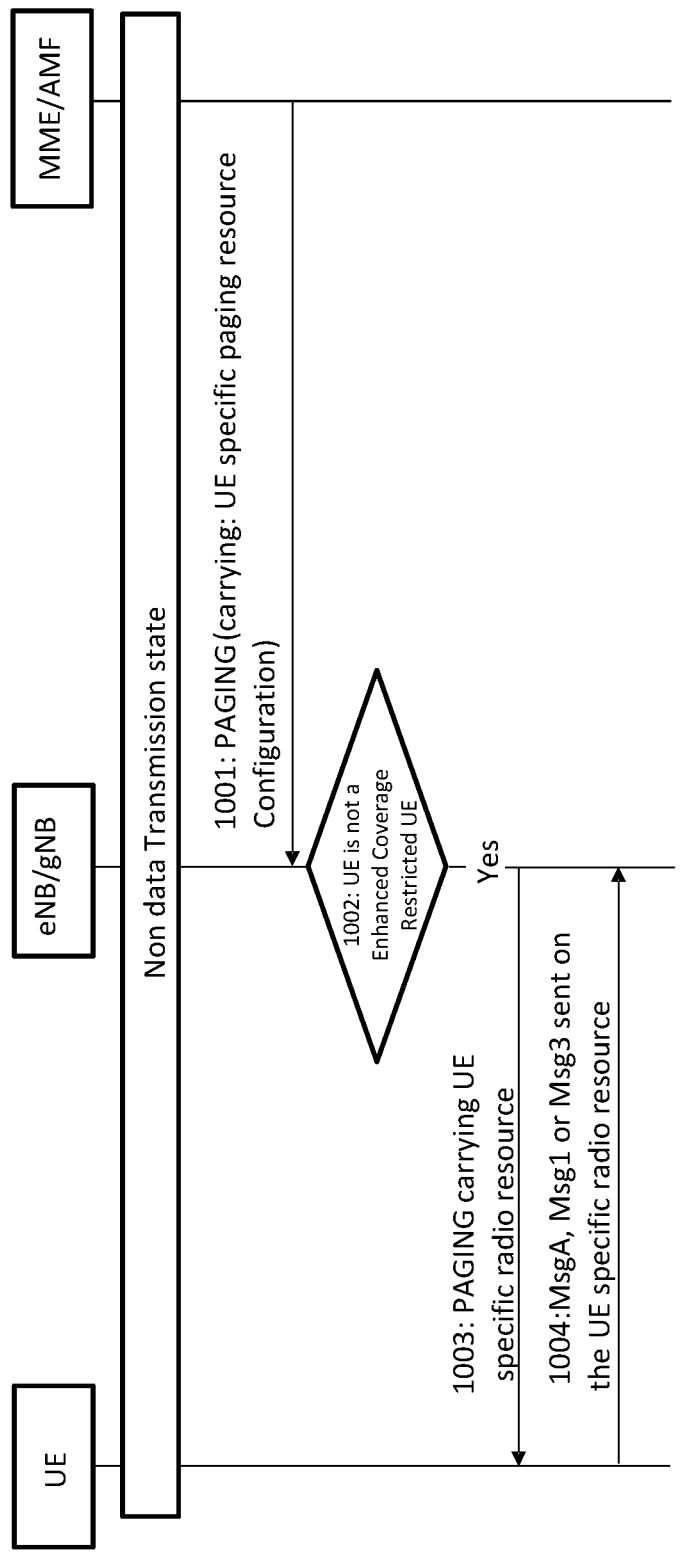
FIG. 10 shows an example of paging carrying a UE specific dedicated resource configuration.
Figure 11:
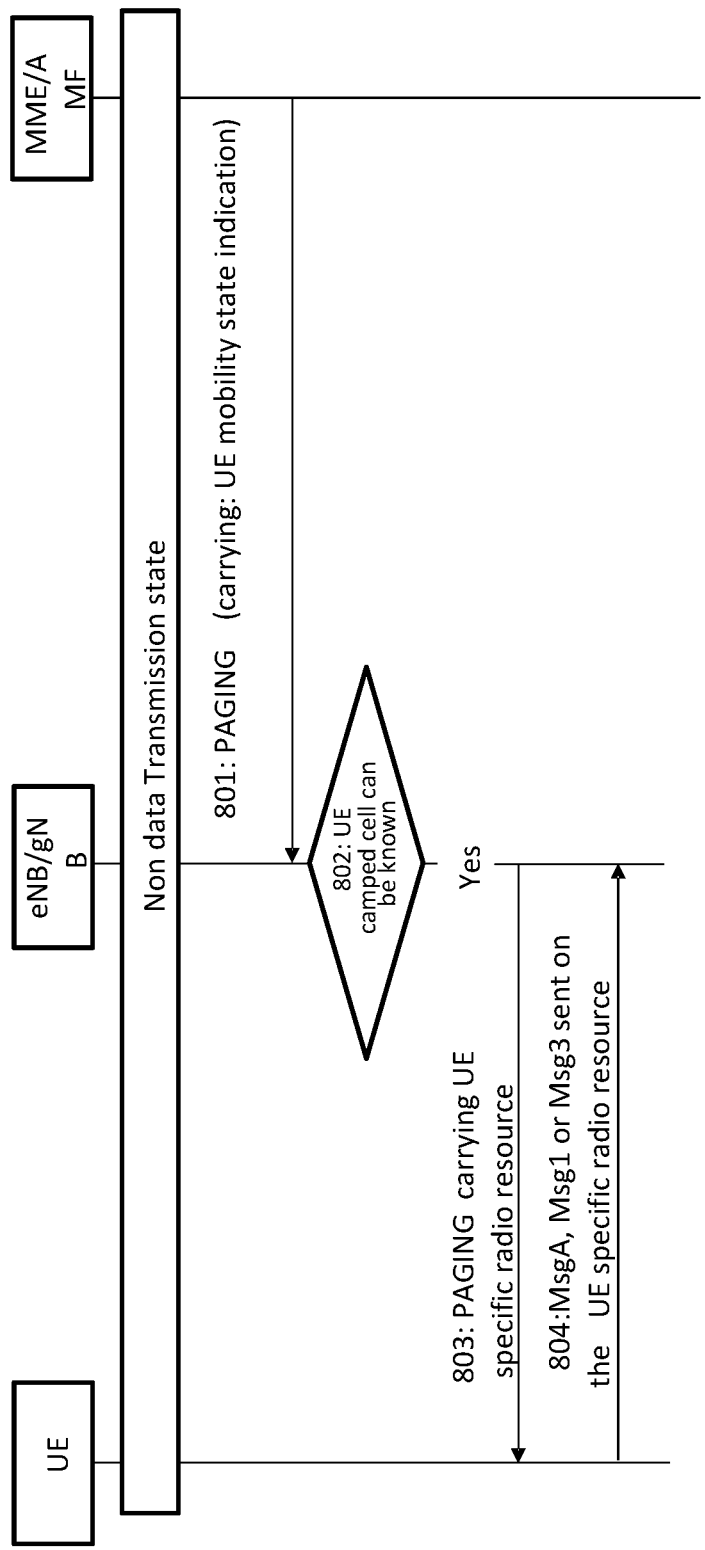
FIG. 11 shows an example of paging carrying a UE specific dedicated resource configuration based on a UE mobility state indication.

FIG. 10 shows an example of paging carrying a UE specific dedicated resource configuration. FIG. 11 shows an example of paging carrying a UE specific dedicated resource configuration based on a UE mobility state indication.

In some implementations, the paging message (PAGING) from MME/AMF carries UE mobility state indication, which includes at least one of geo-stationary indication, a movement trajectory of the UE, or the last camped cell identity (Step 1101), based on which eNB or gNB can decide the cell that the UE camps.

In some implementations, the base station (e.g., eNB or gNB) can configure UE specific/dedicated radio resource in the paging message (PAGING) transmitted to UE. Here, the UE specific/dedicated radio resource includes at least one of Msg A resource, Contention Free Random Access resource (CFRA), multiple CFRA resource related multiple cell beams or multiple SSBs respectively, UL resource grant for UL transmission (e.g., Msg3 transmission), UE specific RNTI (e.g., C-RNTI), UE specific PDCCH search space.

(step 1003), CBRA related information, essential SI information for MT-access, or MT-access related information in cell-free cases.

Upon receiving the UE specific/dedicated radio resource in the paging message (PAGING), UE can perform the UL transmission based on the UE specific/dedicated radio resource. In some implementations, UE may perform 2-step PRACH procedure (transmission MsgA for 2-step PRACH), perform a contention-free random access (CFRA) (Msg1), transmit Msg3 on the UL grant and/or monitor the PDCCH associated the UE specific RNTI on the UE specific PDCCH search (Step 1004).

Where the Msg 3 includes the EDT Msg3, PUR Msg3 or RRC Msg3, e.g., at least one of the following RRC Messages: RRC Early Data Request, RRC Connection Request, RRC Connection Resume Request. If multiple CFRA resource related multiple cell beams or multiple SSBs respectively is provided in PAGING, UE selects one of them based on the selected cell beam to send Msg1 or MsgA.

Figure 12:
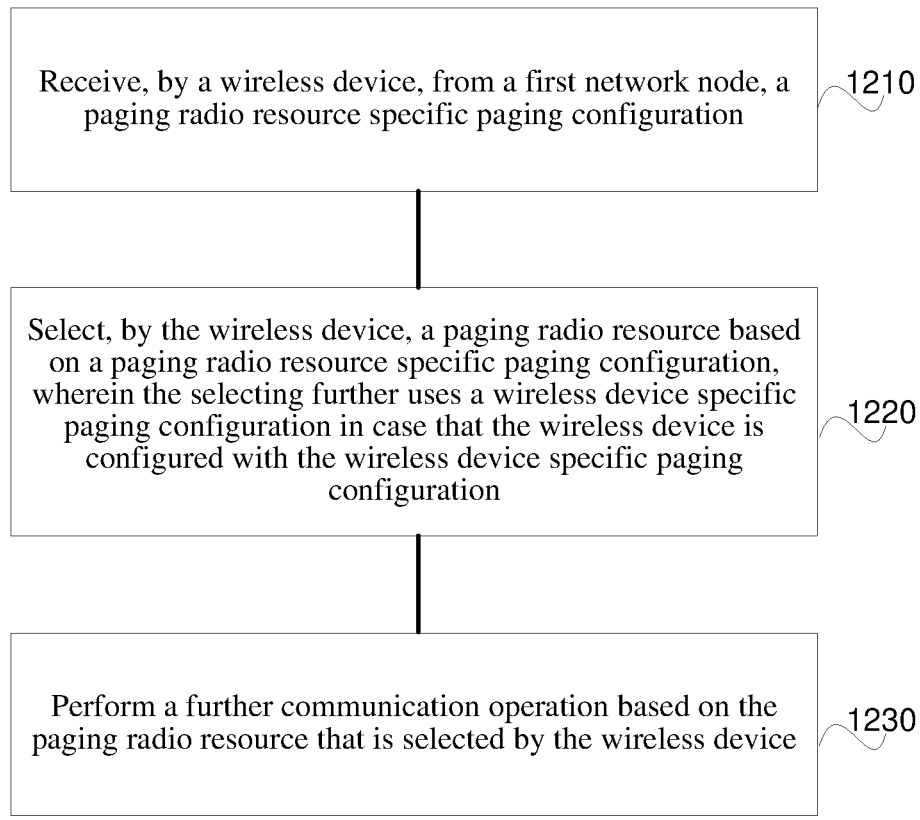
FIG. 12 shows an example of a wireless communication method based on some example embodiments of the disclosed technology.

FIG. 12 shows an example of a wireless communication method based on some example embodiments of the disclosed technology.

In some embodiments of the disclosed technology, a wireless communication method includes, at 1210, receiving, by a wireless device, from a first network node, a paging radio resource specific paging configuration, at 1220, selecting, by the wireless device, a paging radio resource based on a paging radio resource specific paging configuration, wherein the selecting further uses a wireless device specific paging configuration in case that the wireless device is configured with the wireless device specific paging configuration, and, at 1230, performing a further communication operation based on the paging radio resource that is selected by the wireless device. In some implementations, the paging radio resource specific paging configuration may include Rmax-paging, carrier specific DRX cycle for paging, and the number of POs per carrier specific DRX Cycle (e.g., nB) as discussed above. In some implementations, the wireless device specific paging configuration may include UE specific Rmax-paging and UE specific DRX cycle as discussed above. In some implementations, the wireless device includes user equipment (UE), the first network node may be a base station such as eNB or gNB, and the second network node includes the core network including at least one of mobility management entity (MME) or access and mobility management function (AMF).

Figure 13:
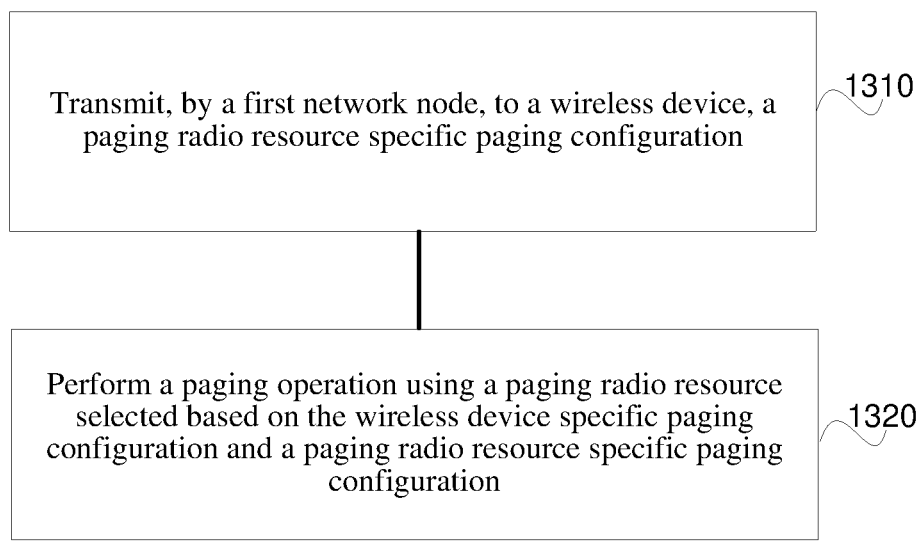
FIG. 13 shows another example of a wireless communication method based on some example embodiments of the disclosed technology.

FIG. 13 shows another example of a wireless communication method based on some example embodiments of the disclosed technology.

In some embodiments of the disclosed technology, a wireless communication method includes, at 1310, transmitting, by a first network node, to a wireless device, a paging radio resource specific paging configuration, and, at 1320, performing a paging operation using a paging radio resource selected based on the wireless device specific paging configuration and a paging radio resource specific paging configuration. In some implementations, the paging radio resource specific paging configuration may include Rmax-paging, carrier specific DRX cycle for paging, and the number of POs per carrier specific DRX Cycle (e.g., nB) as discussed above. In some implementations, the wireless device specific paging configuration may include UE specific Rmax-paging and UE specific DRX cycle as discussed above. In some implementations, the wireless device includes user equipment (UE), the first network node may be a base station such as eNB or gNB, and the second network node includes the core network including at least one of mobility management entity (MME) or access and mobility management function (AMF).

Figure 14:
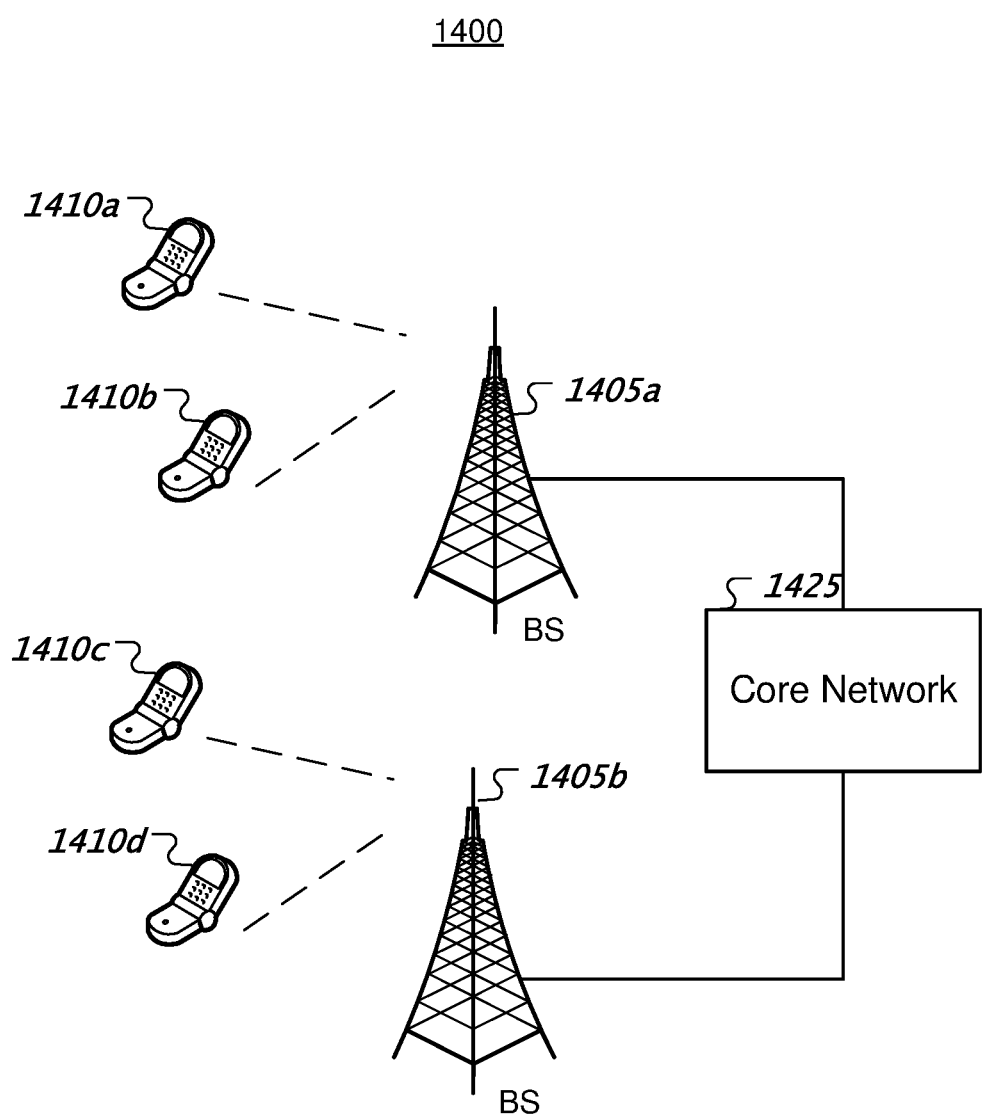
FIG. 14 shows an example of a wireless communication system where techniques in accordance with one or more embodiments of the present technology can be applied.

FIG. 14 shows an example of a wireless communication system 1400 where techniques in accordance with one or more embodiments of the present technology can be applied. A wireless communication system 1400 can include one or more base stations (BSs) 1405*a*, 1405*b*, one or more wireless devices, or user devices (UEs) 1410*a*, 1410*b*, 1410*c*, 1410*d*, and a core network 1425. A base station 1405*a*, 1405*b* can provide wireless service to wireless devices 1410*a*, 1410*b*, 1410*c* and 1410*d* in one or more wireless sectors. In some implementations, a base station 1405*a*, 1405*b* includes directional antennas to produce two or more directional beams to provide wireless coverage in different sectors.

The core network 1425 can communicate with one or more base stations 1405*a*, 1405*b*. The core network 1425 provides connectivity with other wireless communication systems and wired communication systems. The core network may include one or more service subscription databases to store information related to the subscribed wireless devices 1410*a*, 1410*b*, 1410*c*, and 1410*d*. A first base station 1405*a* can provide wireless service based on a first radio access technology, whereas a second base station 1405*b* can provide wireless service based on a second radio access technology. The base stations 1405*a* and 1405*b* may be co-located or may be separately installed in the field according to the deployment scenario. The wireless devices 1410*a*, 1410*b*, 1410*c*, and 1410*d* can support multiple different radio access technologies. The techniques and embodiments described in the present document may be implemented by the base stations of wireless devices described in the present document.

Figure 15:
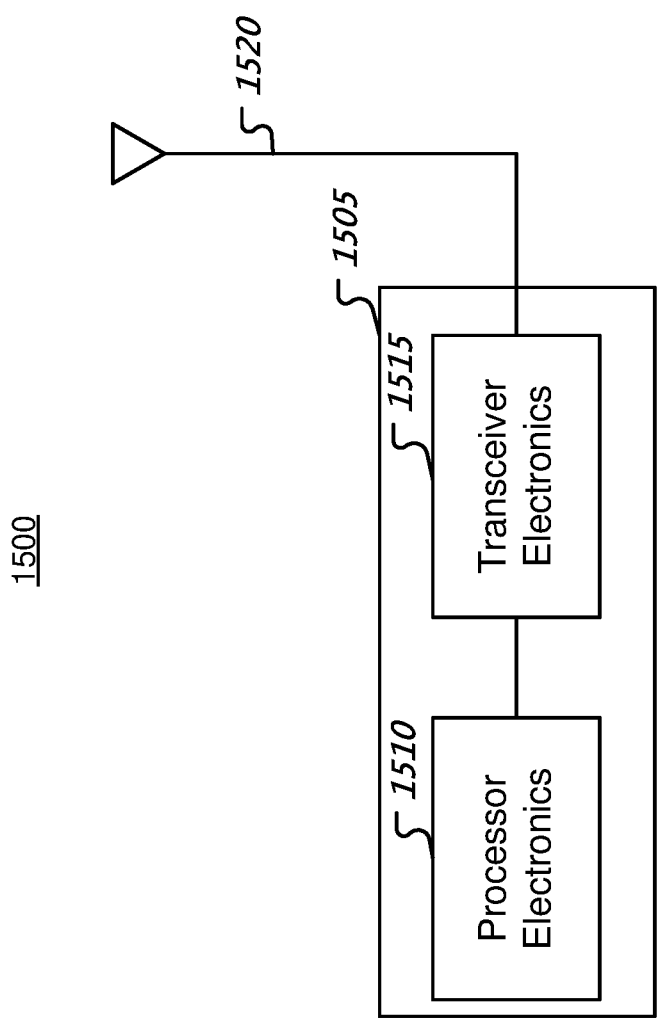
FIG. 15 is a block diagram representation of a portion of a radio station in accordance with one or more embodiments of the present technology can be applied.

FIG. 15 is a block diagram representation of a portion of a radio station in accordance with one or more embodiments of the present technology can be applied. A radio 1505 such as a base station or a wireless device (or UE) can include processor electronics 1510 such as a microprocessor that implements one or more of the wireless techniques presented in this document. The radio 1505 can include transceiver electronics 1515 to send and/or receive wireless signals over one or more communication interfaces such as antenna 1520. The radio 1505 can include other communication interfaces for transmitting and receiving data. Radio 1505 can include one or more memories (not explicitly shown) configured to store information such as data and/or instructions. In some implementations, the processor electronics 1510 can include at least a portion of the transceiver electronics 1515. In some embodiments, at least some of the disclosed techniques, modules or functions are implemented using the radio 1505. In some embodiments, the radio 1505 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may be used to implement one or more of the following solutions, listed in clause-format. The following clauses are supported and further described in the examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station.

Clause 1. A method of wireless communication, comprising receiving, by a wireless device, from a first network node, a paging radio resource specific paging configuration, selecting, by the wireless device, a paging radio resource based on a paging radio resource specific paging configuration, wherein the selecting further uses a wireless device specific paging configuration in case that the wireless device is configured with the wireless device specific paging configuration, and performing a further communication operation based on the paging radio resource that is selected by the wireless device. In some implementations, the paging radio resource specific paging configuration may include Rmax-paging, carrier specific DRX cycle for paging, and the number of POs per carrier specific DRX Cycle (e.g., nB). In some implementations, the wireless device specific paging configuration may include UE specific Rmax-paging and UE specific DRX cycle.

Clause 2. The method of clause 1, wherein the paging radio resource specific paging configuration includes at least one of carrier specific paging configuration configured per paging carrier, narrow band specific paging configuration configured per paging narrowband, paging physical resource block (PRB) specific paging configuration configure per paging PRB, bandwidth part (BWP) specific paging configuration configure per paging BWP, or control-resource set (CORESET) specific paging configuration configure per paging CORESET.

Clause 3. The method of clause 1, wherein the paging radio resource includes at least one of paging carrier, paging narrowband, paging physical resource block (PRB), paging bandwidth part (BWP), or paging control-resource set (CORESET).

Clause 4. The method of clause 1, wherein the further communication operation comprises receiving a paging message on the paging radio resource from the first network node.

Clause 5. The method of clause 1, wherein the wireless device specific paging configuration is negotiated by a non-access stratum (NAS) signaling with a second network node.

Clause 6. The method of clause 5, wherein the wireless device specific paging configuration is negotiated by receiving, by the wireless device, from the first network node, the paging radio resource specific paging configuration including parameters associated with at least one of coverage enhancement level (CEL) for paging or Rmax-paging, determining, by the wireless device, whether to negotiate the wireless device specific paging configuration, and transmitting, by the wireless device, to the second network node, a message indicating the coverage the enhancement level (CEL) for paging preferred or the Rmax-paging preferred, CEL based paging deactivating request, or Rmax based paging deactivating request.

Clause 7. The method of clause 5, wherein the wireless device specific paging configuration is negotiated by detecting, by the wireless device, a change in coverage the enhancement level (CEL) for paging or the Rmax-paging, and transmitting, by the wireless device, to the second network node, a message for updating the coverage the enhancement level (CEL) for paging, the Rmax-paging, CEL based paging deactivating request, or Rmax based paging deactivating request.

Clause 8. The method of clause 7, further comprising receiving, by the wireless device, from the first network node, a coverage enhancement level (CEL) for paging or Rmax-paging decision parameters in a system information block (SIB).

Clause 9. The method of clause 8, wherein the coverage enhancement level (CEL) for paging decision parameters includes at least one of reference signal received power (RSRP) thresholds corresponding to different CELs for paging, offset between different cells or hysteresis for CEL change, trigger timer for CEL change, and wherein the Rmax-paging decision parameters include at least one of RSRP thresholds corresponding to different Rmax-paging, Qoffset or Hysteresis for Rmax-paging change, or a trigger timer for Rmax-paging change.

Clause 10. The method of clause 9, wherein a change in the coverage enhancement level (CEL) for paging or the Rmax-paging is detected in the wireless device by comparing a measured RSRP with a configured RSRP threshold plus or minus a RSRP change margin, and detecting the CEL for paging or the Rmax-paging changes in case that the measured RSRP exceeds the RSRP threshold plus or minus the RSRP change margin during the trigger timer.

Clause 11. The method of clause 5, wherein the wireless device specific paging configuration is negotiated by transmitting, by the wireless device, a message indicating a paging radio resource selection capability based on a paging radio resource specific discontinuous reception (DRX) cycle to the second network node.

Clause 12. The method of any of clauses 6-11, wherein the message indicating the CEL for paging, Rmax-paging or paging radio resource selection capability based on a paging radio resource specific discontinuous reception (DRX) cycle includes at least one of an attach request or a tracking area update request message.

Clause 13. The method of clause 1, wherein the wireless device specific paging configuration is negotiated by an access stratum (AS) signaling.

Clause 14. The method of clause 1, wherein the wireless device specific paging configuration is negotiated by receiving, by the wireless device, from the first network node, the paging radio resource specific paging configuration including parameters associated with at least one of coverage enhancement level (CEL) for paging or Rmax-paging, and determining, by the wireless device, whether to negotiate the wireless device specific paging configuration, or detecting, by the wireless device, a change in a coverage the enhancement level (CEL) for paging or the Rmax-paging.

Clause 15. The method of clause 14, further comprising receiving, by the wireless device, from the first network node, the coverage enhancement level (CEL) for paging or Rmax-paging decision parameters in a system information block (SIB).

Clause 16. The method of clause 15, wherein the coverage enhancement level (CEL) for paging decision parameters includes at least one of reference signal received power (RSRP) thresholds corresponding to different CELs for paging, Qoffset or Hysteresis for CEL change, a trigger timer for CEL change, and wherein the Rmax-paging decision parameters include at least one of RSRP thresholds corresponding to different Rmax-paging, Qoffset or Hysteresis for Rmax-paging change, a trigger timer for Rmax-paging change.

Clause 17. The method of clause 16, wherein a change in the coverage the enhancement level (CEL) for paging or the Rmax-paging is detected in the wireless device by comparing a measured RSRP with a configured RSRP threshold plus or minus a RSRP change margin, and detecting the CEL for paging or the Rmax-paging changes in case that the measured RSRP exceeds the RSRP threshold plus or minus the RSRP change margin during the trigger timer.

Clause 18. The method of clause 13, further comprising transmitting, by the wireless device, to the first network node, a paging information request message.

Clause 19. The method of clause 18, wherein the paging information request message is sent by at least one of UL MAC CE, RRC Connection Reconfiguration Complete, RRC Connection Reestablishment Complete, RRC Connection Resume Complete, RC Connection Setup Complete, RRC Early Data Request, UE Assistance Information, UE Capability Information, or other UL RRC messages.

Clause 20. The method of clause 18, wherein the paging information request message includes at least one of coverage enhancement level (CEL) for paging request, Rmax-paging request, the CEL-paging based paging resource selection capability, the Rmax-paging based paging resource selection capability, CEL based paging deactivating request, or Rmax based paging deactivating request.

Clause 21. The method of clause 18, further comprising receiving, from the first network node, a wireless device specific paging configuration including parameters associated with at least one of coverage enhancement level (CEL) for paging or Rmax-paging, CEL based paging deactivating indication, or Rmax based paging deactivating indication.

Clause 22. The method of clause 21, wherein the wireless device specific paging configuration is included in at least one of RRC Connection Release, RRC Early Data Complete, DCI or DL MAC CE message.

Clause 23. The method of clause 13, further comprising transmitting, by the wireless device, to the first network node, a paging radio resource selection capability based on a paging radio resource specific discontinuous reception (DRX) cycle.

Clause 24. The method of clause 23, wherein the paging radio resource selection capability based on a paging radio resource specific discontinuous reception (DRX) cycle is sent by ue-Radio Paging Info IE in UE Capability Information message.

Clause 25. A method of wireless communication, comprising transmitting, by a first network node, to a wireless device, a paging radio resource specific paging configuration, and performing a paging operation using a paging radio resource selected based on the wireless device specific paging configuration and a paging radio resource specific paging configuration. In some implementations, the paging radio resource specific paging configuration may include Rmax-paging, carrier specific DRX cycle for paging, and the number of POs per carrier specific DRX Cycle (e.g., nB). In some implementations, the wireless device specific paging configuration may include UE specific Rmax-paging and UE specific DRX cycle.

Clause 26. The method of clause 25, further comprising transmitting, from the first network node, to the wireless device, a coverage enhancement level (CEL) for paging or Rmax-paging decision parameters in a system information block (SIB).

Clause 27. The method of clause 26, wherein the coverage enhancement level (CEL) for paging decision parameters includes at least one of reference signal received power (RSRP) thresholds corresponding to different CELs for paging, Qoffset or Hysteresis for CEL change, a trigger timer for CEL change, and wherein the Rmax-paging decision parameters include at least one of RSRP thresholds corresponds to different Rmax-paging, Qoffset or Hysteresis for Rmax-paging change, a trigger timer for Rmax-paging change.

Clause 28. The method of clause 25, wherein the wireless device specific paging configuration is negotiated by a non-access stratum (NAS) signaling.

Clause 29. The method of clause 25, wherein the wireless device specific paging configuration includes at least one of coverage enhancement level (CEL) for paging, Rmax-paging, or a paging radio resource selection capability based on a paging radio resource specific discontinuous reception (DRX) cycle, Rmax-paging based paging indication or CEL based paging indication.

Clause 30. The method of clause 25, wherein the wireless device specific paging configuration is negotiated by an access stratum (AS) signaling.

Clause 31. The method of clause 30, further comprising receiving, by the first network node, from the wireless device, a paging information request message.

Clause 32. The method of clause 31, wherein the paging information request message includes at least one of coverage enhancement level (CEL) request or a maximum number of repetitions for a narrowband physical downlink control channel (NPDCCH) common search space (CSS) for paging (Rmax-paging) request.

Clause 33. The method of clause 30, further comprising estimating, by the first network node, the wireless device specific paging configuration associated with the wireless device based on at least one of information in data transmission state or a paging information request.

Clause 34. The method of clause 33, further comprising, transmitting, by the first network node, to a second network node, a wireless device specific paging configuration associated with the wireless device.

Clause 35. The method of clause 33, wherein the wireless device specific paging configuration is included in at least one of UE context suspend request, UE context release complete, or UE context resume request with fast RRC release indication.

Clause 36. The method of clause 33, further comprising, transmitting, by the first network node, to a wireless device, a wireless device specific paging configuration associated with the wireless device.

Clause 37. The method of clause 36, wherein the wireless device specific paging configuration is included in at least one of RRC Connection Release, RRC Early Data Complete, DCI or DL MAC CE message.

Clause 38. The method of clause 37, wherein the data transmission state includes at least one of radio resource control (RRC) connected state, radio resource control (RRC) inactive state, Preconfigured Uplink Resource (PUR) transmission procedure, early data transmission (EDT) procedure, or new radio (NR) small data transmission procedure.

Clause 39. The method of clause 30, further comprising receiving, by the wireless device, to the first network node, a paging radio resource selection capability based on a paging radio resource specific discontinuous reception (DRX) cycle.

Clause 40. The method of clause 39, wherein the paging radio resource selection capability based on a paging radio resource specific discontinuous reception (DRX) cycle is sent by ue-Radio Paging Info IE in UE Capability Information message.

Clause 41. The method of clause 40, further comprising, transmitting, by the first network node, to a second network node, a paging radio resource selection capability based on a paging radio resource specific discontinuous reception (DRX) cycle.

Clause 42. The method of clause 40, wherein the paging radio resource selection capability based on a paging radio resource specific discontinuous reception (DRX) cycle is sent by UE radio capability for paging IE in UE capability information indication message.

Clause 43. The method of any of clauses 1-42, wherein the paging radio resource specific paging configuration includes a first value associated with a corresponding paging radio resource, and the wireless device specific paging configuration includes a second value indicating a maximum number of paging repetitions associated with the wireless device.

Clause 44. The method of clause 43, wherein the performing the paging operation using the paging radio resource selected based on the wireless device specific paging configuration and the paging radio resource specific paging configuration further includes selecting one or more candidate paging radio resources with a minimum first value among paging radio resources with the first value that is larger than or equal to the second value, and selecting, among the selected one or more candidate paging radio resources, at least one of a paging radio resource based on at least one of a wireless device identifier, a paging radio resource weight, or a group wake-up signal.

Clause 45. The method of clause 43, wherein the performing the paging operation using the paging radio resource selected based on the wireless device specific paging configuration and the paging radio resource specific paging configuration further includes selecting one or more candidate paging radio resources with a minimum first value among paging radio resources with the first value that is larger than or equal to the second value, selecting, among the selected candidate one or more paging carriers, one or more paging radio resources with a group wake-up signal upon monitoring, by the wireless device, the group wake-up signal in the paging radio resources, and selecting, among the one or more paging radio resources, one paging radio resource based on at least one of a wireless device identifier or a paging radio resource weight.

Clause 46. The method of clause 43, wherein the first value includes a maximum number of repetitions for a narrowband physical downlink control channel (NPDCCH) common search space (CSS) for paging (Rmax-paging) that is defined on a paging radio resource basis, and the second value includes an Rmax-paging that is defined on a wireless device basis.

Clause 47. The method of clause 43, wherein the first value includes a CEL that is defined on a paging radio resource basis, and the second value includes an CEL for paging that is defined on a wireless device basis.

Clause 48. The method of clause 43, wherein the first value includes a discontinuous reception (DRX) cycle that is defined on a paging radio resource basis, and the second value includes a discontinuous reception (DRX) cycle that is defined on a wireless device basis.

Clause 49. The method of any of clauses 1-48, wherein the paging radio resource specific paging configuration is transmitted using a system information block (SIB).

Clause 50. The method of any of clauses 1-48, wherein the paging radio resource specific paging configuration includes at least one of a maximum number of repetitions for a narrowband physical downlink control channel (NPDCCH) common search space (CSS) for paging (Rmax-paging), a coverage enhancement level (CEL) corresponding to the paging radio resource, a paging radio resource specific discontinuous reception (DRX) cycle for paging, or a number of paging occasions (POs) per radio resource specific DRX cycle (nB).

Clause 51. The method of any of clauses 1-48, further comprising, transmitting, by the first network node, to the second network node, a management message associated with a paging radio resource specific discontinuous reception (DRX) cycle for paging.

Clause 52. The method of clause 51, wherein the management message includes at least one of S1 set up request, eNB configuration update, NG setup request, or RAN configuration update.

Clause 53. The method of clause 51, wherein the management message includes at least one of a list of paging radio resource specific discontinuous reception (DRX) cycles, a list of mappings between the narrowband physical downlink control channel (NPDCCH) common search space (CSS) for paging (Rmax-paging) and the paging radio resource specific discontinuous reception (DRX) cycle for paging, or a list of mappings between the coverage enhancement level (CEL) for paging and the paging radio resource specific discontinuous reception (DRX) cycle for paging.

Clause 54. The method of any of clauses 1-53, further comprising transmitting, by the second network node, to the first network node, a paging message including a wireless device specific paging resource configuration.

Clause 55. The method of any of clauses 1-53, further comprising transmitting, by the second network node, to the first network node, a paging message including a wireless device mobility state indication.

Clause 56. The method of any of clauses 54-55, further comprising configuring, by the first network node, to the wireless device, a wireless device specific radio resource for performing an uplink transmission by the wireless device.

Clause 57. The method of clause 56, wherein the wireless device specific radio resource for performing an uplink transmission includes at least one of Msg A resource, contention free random access resource (CFRA), multiple CFRA resource related multiple cell beams or multiple synchronization signal blocks (SSBs) respectively, uplink (UL) resource grant for UL transmission, wireless device specific radio network temporary identifier (RNTI), wireless device specific physical downlink control channel (PDCCH) search space, contention based random access channel (CBRA) related information, system information for MT-access, mobile terminated (MT) access related information in a cell-free communication.

Clause 58. The method of any of clauses 1-57, wherein further comprising selecting, by the wireless device, with a first network node, a legacy paging radio resource upon determination that the wireless device does not includes the wireless device specific paging configuration information.

Clause 59. The method of any of clauses 1-57, wherein the wireless device includes user equipment (UE).

Clause 60. The method of any of clauses 1-57, wherein the first network node includes at least one of eNB or gNB.

Clause 61. The method of any of clauses 1-57, wherein the second network node includes at least one of mobility management entity (MME) or access and mobility management function (AMF).

Clause 62. An apparatus for wireless communication, comprising a memory and a processor, wherein the processor reads code from the memory and implements a method recited in any of clauses 1 to 61.

Clause 63. A computer readable program storage medium having code stored thereon, the code, when executed by a processor, causing the processor to implement a method recited in any of clauses 1 to 61.

What is claimed is:

1. A method of wireless communication, comprising:
receiving, by a wireless device, from a first network node,
a paging configuration that includes:
a paging radio resource specific paging configuration including at least one of:
a carrier specific paging configuration configured per paging carrier;
a coverage enhancement level (CEL) specific paging configuration configured per CEL; or
a parameter associated with a maximum number of repetitions for a narrowband physical downlink control channel (NPDCCH) common search space (CSS) for paging; and
a wireless device specific paging configuration in case that the wireless device is configured with the wireless device specific paging configuration, wherein the wireless device specific paging configuration is included in at least one of radio resource control (RRC) connection release message or RRC early data complete message;
selecting, by the wireless device, a paging radio resource based on the paging configuration, wherein the paging radio resource includes at least one of a paging carrier or a maximum number of repetitions for NPDCCH CSS for paging; and
performing a communication operation based on the selected paging radio resource.

2. The method of claim 1, wherein the parameter associated with a maximum number of repetitions for the NPDCCH CSS for paging includes a decision parameter associated with a maximum number of repetitions for NPDCCH CSS for paging in a system information block (SIB).

3. The method of claim 1, further comprising:
detecting, by the wireless device, a change in a coverage enhancement level (CEL) for paging.

4. The method of claim 3, wherein the CEL for paging includes at least one of reference signal received power (RSRP) thresholds corresponding to different CELs for paging, or a trigger timer for CEL change.

5. The method of claim 4, wherein the change in the CEL for paging is detected by the wireless device by comparing a measured RSRP with a configured RSRP threshold.

6. The method of claim 1, wherein the wireless device specific paging configuration is negotiated by an access stratum (AS) signaling.

7. The method of claim 6, wherein the wireless device specific paging configuration includes parameters associated with at least one of a coverage enhancement level (CEL) for paging, or a CEL based paging deactivating indication.

8. The method of claim 7, wherein the wireless device specific paging configuration is included in at least one of a radio resource control (RRC) connection release message or an RRC early data complete message.

9. The method of claim 6, further comprising transmitting, by the wireless device, to the first network node, a paging information request message.

10. The method of claim 9, wherein the paging information request message includes a CEL-paging based paging resource selection capability.

11. A method of wireless communication, comprising:
transmitting, by a first network node, to a wireless device,
a paging configuration that includes:
   a paging radio resource specific paging configuration
   including at least one of:
      a carrier specific paging configuration configured per
      paging carrier;
      a coverage enhancement level (CEL) specific paging
      configuration configured per CEL; or
      a parameter associated with a maximum number of
      repetitions for a narrowband physical downlink
      control channel (NPDCCH) common search space
      (CSS) for paging; and
   a wireless device specific paging configuration in case
   that the wireless device is configured with the wireless device specific paging configuration, wherein
   the wireless device specific paging configuration is
   included in at least one of radio resource control
   (RRC) connection release message or RRC early
   data complete message.

12. The method of claim 11, wherein the parameter associated with a maximum number of repetitions for the NPDCCH CSS for paging includes a decision parameter associated with a maximum number of repetitions for NPDCCH CSS for paging in a system information block (SIB).

13. The method of claim 11, further comprising, transmitting, by the first network node, to a second network node, a wireless device specific paging configuration associated with the wireless device.

14. The method of claim 13, wherein the wireless device specific paging configuration is included in at least one of user equipment (UE) context suspend request, UE context release complete, or UE context resume request with fast RRC release indication.

15. An apparatus for wireless communication, comprising a memory and a processor, wherein the processor reads code from the memory and implements a method, comprising:
receiving, by a wireless device, from a first network node,
   a paging configuration that includes:
      a paging radio resource specific paging configuration
      including at least one of:
         a carrier specific paging configuration configured per
         paging carrier;
         a coverage enhancement level (CEL) specific paging
         configuration configured per CEL; or
         a parameter associated with a maximum number of
         repetitions for a narrowband physical downlink
         control channel (NPDCCH) common search space
         (CSS) for paging; and
      a wireless device specific paging configuration in case
      that the wireless device is configured with the wireless device specific paging configuration, wherein
      the wireless device specific paging configuration is
      included in at least one of radio resource control
      (RRC) connection release message or RRC early
      data complete message;
selecting, by the wireless device, a paging radio resource
   based on the paging configuration, wherein the paging
   radio resource includes at least one of a paging carrier
   or a maximum number of repetitions for NPDCCH
   CSS for paging; and
performing a communication operation based on the
   selected paging radio resource.

16. The apparatus of claim 15, wherein the parameter associated with a maximum number of repetitions for the NPDCCH CSS for paging includes a decision parameter associated with a maximum number of repetitions for NPDCCH CSS for paging in a system information block (SIB).

17. The apparatus of claim 15, wherein the method further comprises:
detecting, by the wireless device, a change in a coverage
   enhancement level (CEL) for paging.

18. The apparatus of claim 17, wherein the CEL for paging includes at least one of reference signal received power (RSRP) thresholds corresponding to different CELs for paging, or a trigger timer for CEL change.

19. The apparatus of claim 18, wherein a change in the CEL for paging is detected in the wireless device by comparing a measured RSRP with a configured RSRP threshold.

20. The apparatus of claim 15, wherein the wireless device specific paging configuration is negotiated by an access stratum (AS) signaling.

21. The apparatus of claim 20, wherein the wireless device specific paging configuration includes parameters associated with at least one of a coverage enhancement level (CEL) for paging, or a CEL based paging deactivating indication.

22. The apparatus of claim 21, wherein the wireless device specific paging configuration is included in at least one of a radio resource control (RRC) connection release message or an RRC early data complete message.

23. The apparatus of claim 20, wherein the method further comprises transmitting, by the wireless device, to the first network node, a paging information request message.

* * * * *